United States Patent
Sezerman et al.

(10) Patent No.: US 7,095,931 B2
(45) Date of Patent: Aug. 22, 2006

(54) MICROSTRUCTURING OPTICAL WAVE GUIDE DEVICES WITH FEMTOSECOND OPTICAL PULSES

(75) Inventors: Omur M. Sezerman, Kanata (CA); Kenneth O. Hill, Kanata (CA); Garland Best, Almonte (CA); Dwayne R. J. Miller, Port Credit (CA); Michael Armstrong, Toronto (CA); Shujie Lin, Toronto (CA)

(73) Assignees: Femtonics Corporation, Toronto (CA); Oz Optics Ltd., Nepean (CA)

( * ) Notice: Subject to any disclaimer, the term of this patent is extended or adjusted under 35 U.S.C. 154(b) by 0 days.

(21) Appl. No.: 10/632,111

(22) Filed: Aug. 1, 2003

(65) Prior Publication Data

US 2004/0071420 A1 Apr. 15, 2004

(51) Int. Cl.
*G02B 6/02* (2006.01)
(52) U.S. Cl. .................... 385/123; 385/48; 385/126
(58) Field of Classification Search ......... 385/123–132
See application file for complete search history.

(56) References Cited

U.S. PATENT DOCUMENTS

| | | | |
|---|---|---|---|
| 5,100,589 A | 3/1992 | Ticknor | |
| 5,325,324 A | 6/1994 | Rentzepis et al. | |
| 6,154,593 A * | 11/2000 | Miura et al. | 385/123 |
| 6,307,617 B1 | 10/2001 | Nishiki et al. | |
| 6,385,370 B1 | 5/2002 | Paek et al. | |
| 6,768,850 B1 * | 7/2004 | Dugan et al. | 385/124 |
| 6,853,785 B1 * | 2/2005 | Dunn et al. | 385/123 |
| 2001/0021293 A1 * | 9/2001 | Kouta et al. | 385/37 |
| 2002/0085824 A1 * | 7/2002 | Dugan et al. | 385/129 |
| 2002/0162360 A1 * | 11/2002 | Schaffer et al. | 65/392 |
| 2003/0099452 A1 * | 5/2003 | Borrelli et al. | 385/129 |

OTHER PUBLICATIONS

S-H. Cho et al., "Modification in optical fibers using high-intensity femtosecond lasers", SPIE Conference on Laser Applications in Microelectronics and Optoelectronics Manufacturing IV, San Jose, California, pp. 161-169 (Jan. 1999).*
K.M.Davis et al., "Writing waveguides in glass with a femtosecond laser", Optics Letters, 21(21), pp. 1729-1731(1996).*

(Continued)

Primary Examiner—Leonidas Boutsikaris
(74) Attorney, Agent, or Firm—Jones, Tullar & Cooper, P.C.

(57) ABSTRACT

The present invention is directed to the creation of optical waveguiding devices from standard optical fibers by the creation of zones of permanently altered refractive index characteristics therein. A high intensity femtosecond laser beam is focused at a predetermined target region in the fiber so as to soften the glass material at the target region. After aligning the focal region with the target region in the fiber there will be relative movement between the focal region and the fiber, which has the effect of sweeping the focal region across the fiber in a predetermined path. The result is a zone within the fiber in which the refractive index characteristics of the fiber have been permanently altered so as to control amplitude, phase, spatial propagation or polarization states of light within the material.

40 Claims, 15 Drawing Sheets

OTHER PUBLICATIONS

Stefan Nolte et al., "Femtosecond writing of high quality waveguides inside phosphate glasses and crystalline media using a bifocal approach", SPIE Proceedings, vol. 5340, pp. 164-169(2004).*

Jianrong Qiu et al., "Fabrication of micro-optical components by using a femtosecond laser", SPIE Proceedings, vol. 5350, pp. 1-12 (2004).*

P.S. Westbrook, T.A. Strasser, T. Erdogan, "In-Line Polarimeter Using Blazed Fiber Gratings," IEEE Photonics Technology Letters, vol. 12 ( No. 10), ( Oct. 10, 2000).

E.N. Glezer, M. Milosavljevic, L. Huang, R.J. Finlay, T.H. Her, J.P. Callan, E. Mazur, "Three-Dimensional Optical Storage Inside Transparent Materials," Optics Letter, vol. 21 ( No. 24), ( Dec. 15, 1996).

K.M. Davis, K. Miura, N. Sugimoto, K. Hirao, "Writing Waveguides in Glass With a Femtosecond Laser," Optics Letter, vol. 21 ( No. 21), ( Nov. 1, 1996).

Fujiwara T et al., "UV-Excited Poling and Electrically Tunable Bragg Gratings in Germanosilicate Fiber," Optical Fiber Communication, Summaries of Papers Presented at the Conferenced OFC, p. 347-350, (Mar. 3, 1995).

Hariharan A et al., "Injection of Ultrafast Regenerative Amplifiers with Low Energy Femtosecond Pulses from an Er-doped Fiber Laser," Optics Communications, North-Holland Publishing Co. (Amsterdam, NL), vol. 132 (No. 5), p. 469-473, (Dec. 15, 1996).

* cited by examiner

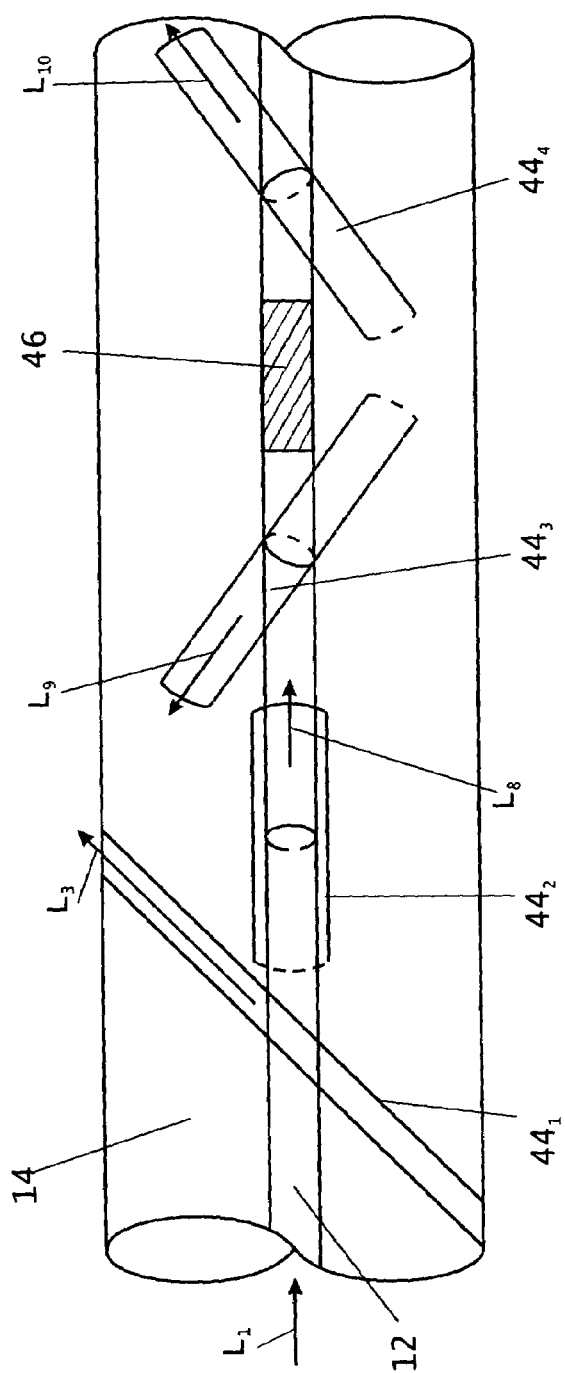
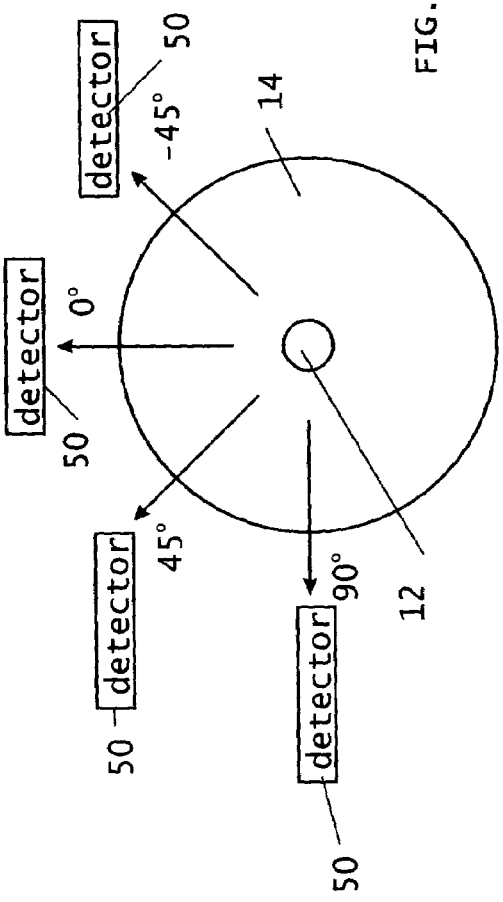
FIG. 11A
FIG. 11B

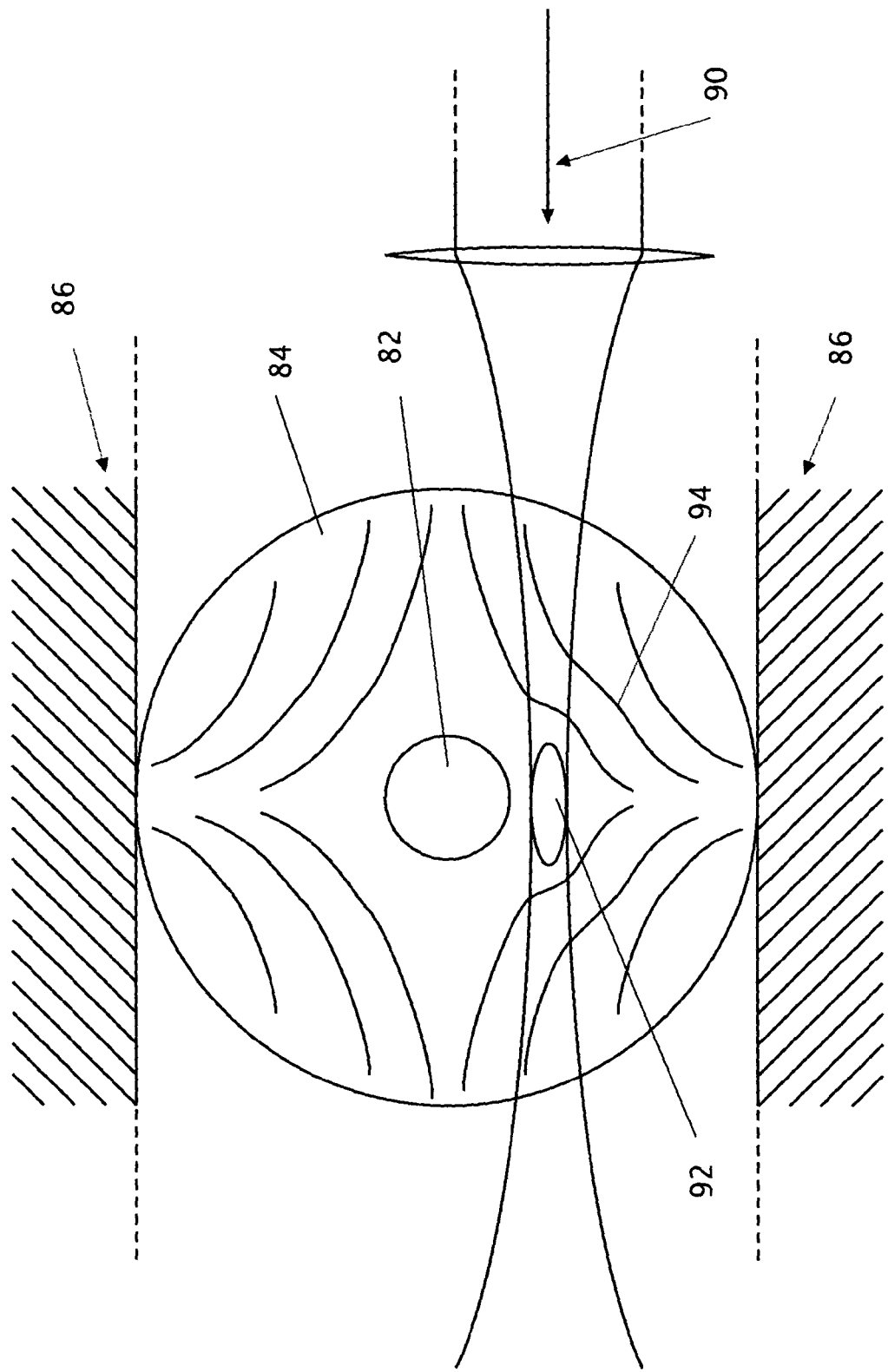

MICROSTRUCTURING OPTICAL WAVE GUIDE DEVICES WITH FEMTOSECOND OPTICAL PULSES

This application claims priority based on Canadian Application No. 2,396,831, filed Aug. 2, 2002.

FIELD OF INVENTION

The invention relates to the creation of permanently altered refractive index zones in glass waveguiding devices, including optical fibers and optical waveguides pre-existed in a glass substrate, using the focused light output of ultrafast pulsed lasers, and to all-fiber devices incorporating such zones exhibiting permanently altered refractive index characteristics.

DESCRIPTION OF THE RELATED ART

All-fiber optical devices have many practical advantages, including low loss, ease of coupling with other fibers, polarization insensitivity, temperature insensitivity, and simple packaging, which make them attractive and low-cost solutions in the optical telecommunications and other industries. All-fiber devices rely on refractive index variations for their functions, and various methods for making permanent refractive index changes have been used in the past. Older methods have relied on exposing photosensitive optical fiber, such as Germanium doped optical fiber, to ultraviolet light to produce refractive index changes in the glass.

A more recent method relies on the use of ultrafast pulsed lasers for producing very high intensity light and the resulting non-linear optical effects which are responsible for the refractive index modification phenomenon, see for example, U.S. Pat. No. 6,297,894 to Miller, et al. This method does not need photosensitive optical fiber. It works with many common optical fibers, including conventional telecommunications, sensor and amplifier fibers as well as undoped optical fibers, and photosensitive optical fibers. This particular patent is based on the premise expounded by K. M. Davis et al in Opt. Lett. 21, 1729 (1996) and in a paper by E. N. Glezer et al in Opt. Lett. 21, 2023 (1996) to the effect that refractive index changes ($\Delta n$) of about 0.1 written in fused silica using tightly focused pulses with peak intensities of about $10^{13}$ W/cm$^2$ are due to the creation of free electrons through multiphoton ionization of bound charges, followed by avalanche ionization and localized dielectric breakdown as the free electrons are accelerated by the intense laser field. This leads to a localized melting and compaction of material and to a concurrent increase in the index of refraction.

Ultrafast pulsed lasers allow moderate pulse energies to produce very high peak pulse intensities. Focusing the laser beam with lenses or mirrors achieves peak pulse intensities of $10^{10}$ W/cm$^2$ and higher in the focal region, which is above the threshold for inducing permanent refractive index changes.

SUMMARY OF THE INVENTION

The present invention is directed to the creation of zones of permanently altered refractive index characteristics in glass, particularly in optical waveguides and optical fibers, based on the principles expounded by Glezer et al and by Davis et al. Such zones in which the refractive index has been permanently altered are created in glass using a very high intensity laser beam which is produced by focusing the light output from an ultrafast pulsed laser at a predetermined target region in the glass. The preferred laser system for this invention is one in which the output of a frequency-doubled Erbium-doped fiber laser is amplified in a laser regenerative amplifier that is based on a Ti:Sapphire gain material, providing light pulses of approximately 100 femtosecond duration, each with an energy of between about 1 nanojoule and 1 millijoule, and preferably at a pulse repetition rate of between 500 Hz and 1 GHz. The invention embodies the use of laser repetition rates selected so that the time interval between laser pulses interacting with the material is shorter than the thermal diffusion time out of the volume element being modified by the laser. This time depends on the laser spot size and thermal diffusivity of the specific material. The temperature of the glass is raised to the liquefying point thereby enabling optimal compaction of the written area with minimal stress.

With the present invention, one or more zones of permanently altered refractive index characteristics can be formed in a waveguiding device, such as an optical fiber, by utilizing a focused, pulsed, laser light source which generates a focal region having an intensity greater than the threshold for inducing permanent refractive index changes in the device. The focal region is aligned with the device and relative movement between the focal region and the device has the effect of sweeping the focal region across the device in a predetermined path. The result is a zone within the device in which the refractive index characteristics of the device have been permanently altered. By controlling the intensity, the size, the duration, and the path of the moving focal region one or more zones of accurately defined dimensions can be created.

The altered zones in optical waveguides and fibers have a threefold effect. First, refractive index changes in the core and in the core-cladding boundary region, and possibly in the evanescent region in the cladding, allow light propagating in the core to escape to the cladding. Second, the altered zone itself acts as an optical waveguide, allowing light propagating in the core to escape to and then from the altered zone. Third, the surface of a suitably oriented altered zone acts as a reflecting surface. These three effects can be used for making all-fiber devices.

An all-fiber attenuator, an all-fiber tap, and an all-fiber polarimeter will be described hereinafter. All-fiber attenuators utilizing the three effects mentioned above scatter light out of the core, thereby achieving adjustable losses of 0–40 dB which can be set in less than 0.1 dB increments. All-fiber taps can be made with a typical tap ratio of 1%. All-fiber polarimeters utilize the reflecting surfaces of altered zones that are oriented at Brewster angles to reflect s-polarized light out of the core. By using four of such altered zones which are positioned along the length of an optical waveguide or fiber, with azimuthal angles spaced 45 degrees apart, all four Stokes parameters that completely specify the polarization state of the light propagating in the core can be measured. The optical return loss for all-fiber devices made with altered zones is greater than 40 dB. With the present invention it is possible to manipulate and control all possible states of lights within an optical fiber or preexisting waveguide, including amplitude, phase, polarization and propagation direction.

It is also possible to create more complex devices, such as interleavers and Mach-Zehnder interferometers, based on multiple core and/or multiple cladding fibers. Such devices could be based, for example, on interconnecting different cores within a multiple core fiber using methods described herein to couple light into and out of altered index of refraction zones within the fiber and into and out of different cores in the fiber. Such a method could be used to create a wide variety of complex devices with a significant reduction in manufacturing, packaging and engineering costs. Such devices would be much more compact than similar devices manufactured using other methods.

The creation of such altered zones to control the states of light propagation in a fiber eliminates the need for precision alignment at the input and/or the output of the fiber into another fiber. This greatly reduces the insertion losses and the cost of the all-fiber device. Additionally, the process of the present invention is one that can be fully automated, thereby reducing the cost of achieving waveguides with the permanently altered zones therein and ensuring the production of consistent and high quality components.

In summary, the present invention may be generally considered to provide a method of creating a zone of permanently altered refractive index characteristics in an optical waveguiding device made of glass material having at least one core and at least one cladding, using a beam which is generated by a focused pulsed laser light source having: (i) a wavelength greater than the absorption edge of the glass material; (ii) a pulse width of less than 1 picosecond, and a pulse energy of between 1 nanojoule and 1 millijoule; and (iii) capable of achieving a peak pulse intensity within a defined focal region; comprising the steps of: (a) aligning the laser beam focal region with a defined target region within the waveguiding device; and (b) operating the laser light source with the peak pulse intensity thereof and a repetition rate thereof selected to accumulate heat and to soften the glass material at the target region and to thereby induce permanent refractive index changes in the waveguiding device at the target region.

The invention may also be considered to encompass an optical waveguiding device having at least one core, at least one cladding, and at least a single zone therein at which the refractive index characteristics of the waveguiding device have been permanently altered, whereby the altered waveguiding device can serve as an attenuator, a polarimeter, an optical tap, or a more complex device.

Other beneficial material modification techniques that fall within the scope of this invention can be used for femtosecond-pulse-assisted microstructuring of an optical waveguide device. In general, these special techniques involve the addition of externally applied stimuli to the femtosecond-pulse micro structuring methods described in the body of the specification. Combining additional stimuli together with femtosecond pulse exposure increases the functionality of femtosecond-pulse-modified optical-waveguide technology, as described below.

BRIEF DESCRIPTION OF THE DRAWINGS

FIG. 3 is an end view similar to that of FIG. 1 but showing the use of a pair of laser beams to create a zone of altered refractive index characteristics in the waveguiding device.

FIG. 4 is a view similar to that of FIG. 1 but showing the use of an optical mirror to focus a single laser beam.

FIG. 11A is a top plan view of a polarimeter having four altered zones and a $\lambda/2$ wave plate between a pair of altered zones.

FIG. 11B is an end view of the polarimeter of FIG. 11A.

FIG. 14B is an end view illustrating the creation of a zone of permanently altered refractive index characteristics during the application of mechanical stress.

DESCRIPTION OF THE INVENTION

The basic principles of the present invention will be described immediately hereinafter with particular reference to what is shown in FIGS. 1–5. Further details respecting practical applications of the invention will be described thereafter with reference to FIGS. 6 to 15C. Information respecting the laser and other operating aspects of the invention will then be described, as they are common to the different physical manifestations of practicing the method.

The Basics

Figure 1:
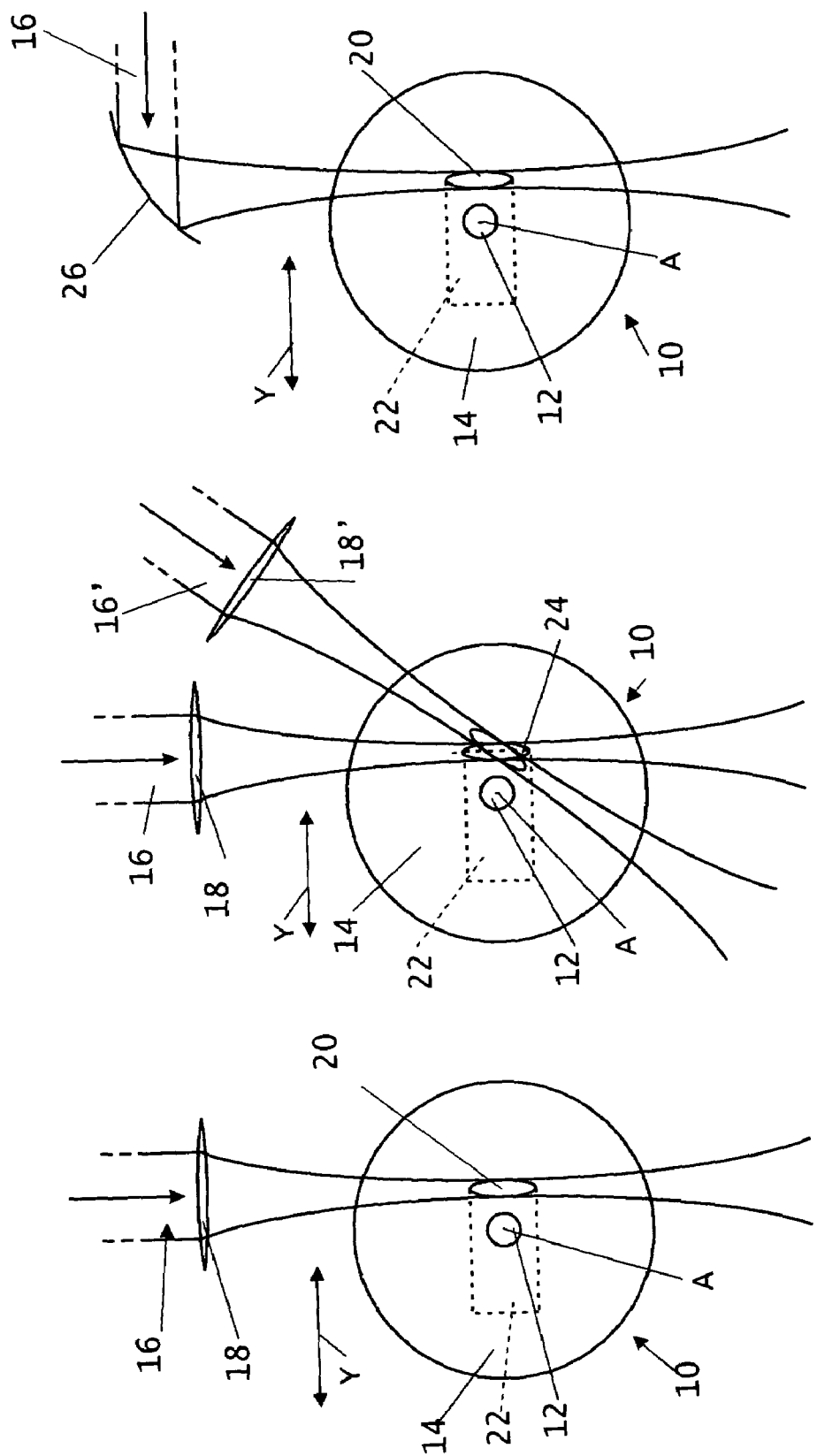
FIG. 1 is an end view of a waveguiding device showing the basic principles of the method of the present invention with a single laser beam.

FIG. 1 generally illustrates the basic principle of this invention, being the creation of a zone of permanently altered refractive index characteristics in a waveguiding device such as an optical fiber 10. The fiber is shown as including a central core 12 and a cladding 14 both of which are generally symmetrical about a longitudinal axis A. A laser, to be described in greater detail hereinafter, is positioned relative to the waveguiding device so that a collimated beam 16 thereof is directed towards the waveguiding device, generally at 90 degrees to the longitudinal axis A. In the configuration shown in FIG. 1 the laser is located above the waveguiding device, although it could just as easily be positioned to one side thereof.

A lens 18 is positioned in the beam path so that the lens will focus the beam, creating a focal region 20 that will be of a predetermined size relative to the waveguiding device, especially relative to the diameter of the core 12, and that will be located with its center generally aligned laterally in the same plane as the longitudinal axis A. The lens can be any optic such as a parabolic mirror, axicon, spherical or cylindrical element that is further used to make a beam focus that produces a desired index profile in the interaction zone. The focusing condition represented by this lens can be improved by the use of index matching fluids to remove surface aberrations. Means, of a conventional nature, are provided to move or sweep the focal region 20 laterally relative to the waveguiding device (arrow Y) so that the focal region 20 enters the device and is swept thereacross. As will be described hereinafter the laser is operated within parameters that cause the focal region 20 to permanently alter the refractive index characteristics of the waveguiding device along the path that it follows as it is swept through the device. By controlling the operation of the laser it is possible to accurately define the size and position of the altered zone within the waveguiding device. A permanently altered zone is one that cannot be erased, as for example by heating the fiber to a temperature sufficient to erase conventionally produced anomalies in the fiber but below the melting temperature of the fiber.

Figure 2:
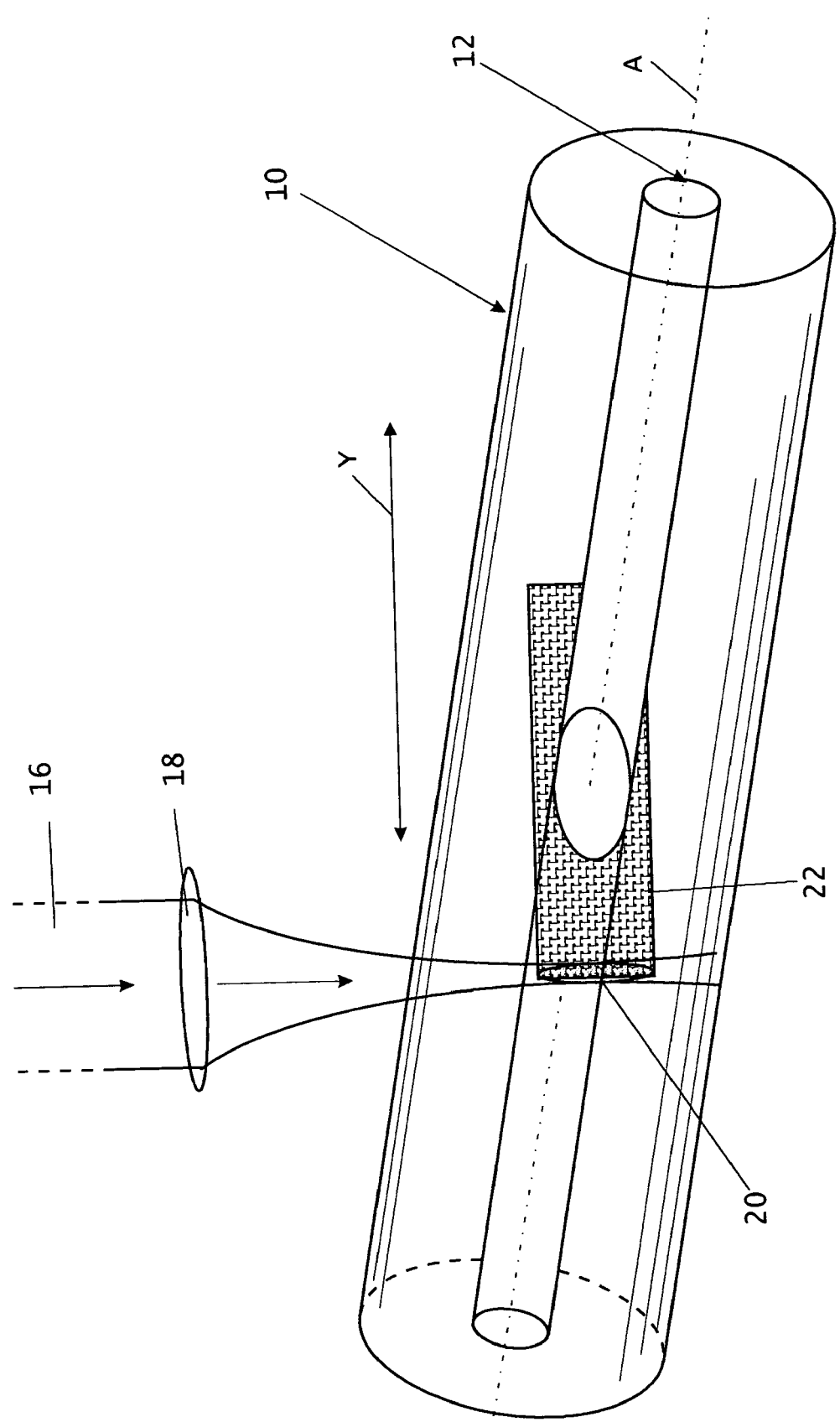
FIG. 2 is a perspective schematic view of a portion of a waveguiding device with a zone of permanently altered refractive index characteristics created therein, illustrating as well the basic principles of the present method.

FIG. 2 shows in a perspective view the waveguiding device in the form of a glass fiber 10 including a central core 12 and a cladding 14 both of which are symmetrical about the longitudinal axis A. Extending across at least a portion of the fiber core 12 and/or at least a portion of the cladding 14 is a zone 22 of permanently altered refractive index characteristics, created using a method as described with reference to FIG. 1. The height of the altered zone 22 is defined by the height of the focal region 20 and its lateral extent within the fiber is determined by the sweeping motion of the focal region along path Y and the intensity of the laser beam. The zone 22 of permanently altered refractive index characteristics will have practical application, as will be discussed hereinafter, in the context of the creation of fiber attenuators, taps, polarimeters and other more complex devices.

FIG. 3 illustrates a method of creating a zone of permanently altered refractive index within a waveguiding device 10 using a pair of laser beams 16 and 16'. In this case the laser beams are focused by lenses 18, 18' and directed towards the waveguiding device so that the focal region 24 exhibits an intensity which is generally a summation of the individual laser beam intensities. This arrangement can be used to create a focal region of increased intensity if a pair of lasers generally the same as the single laser of FIG. 1 is used. This arrangement also allows for the utilization of individual lasers of reduced intensity, when compared to the single-laser scenario of FIG. 1, with the additive intensity at the focal region being generally equal to that of the single-laser scenario. It also provides a method of further localizing the altered zone 22, if desired.

FIG. 4 is a view similar to that of FIG. 1, but showing that the laser beam 16 can be directed from an angle other than normal to the longitudinal axis A. In this case the beam is redirected and focused by a mirror 26 so that the desired focal region 20 is created at the desired location relative to the waveguiding device.

Figure 5:
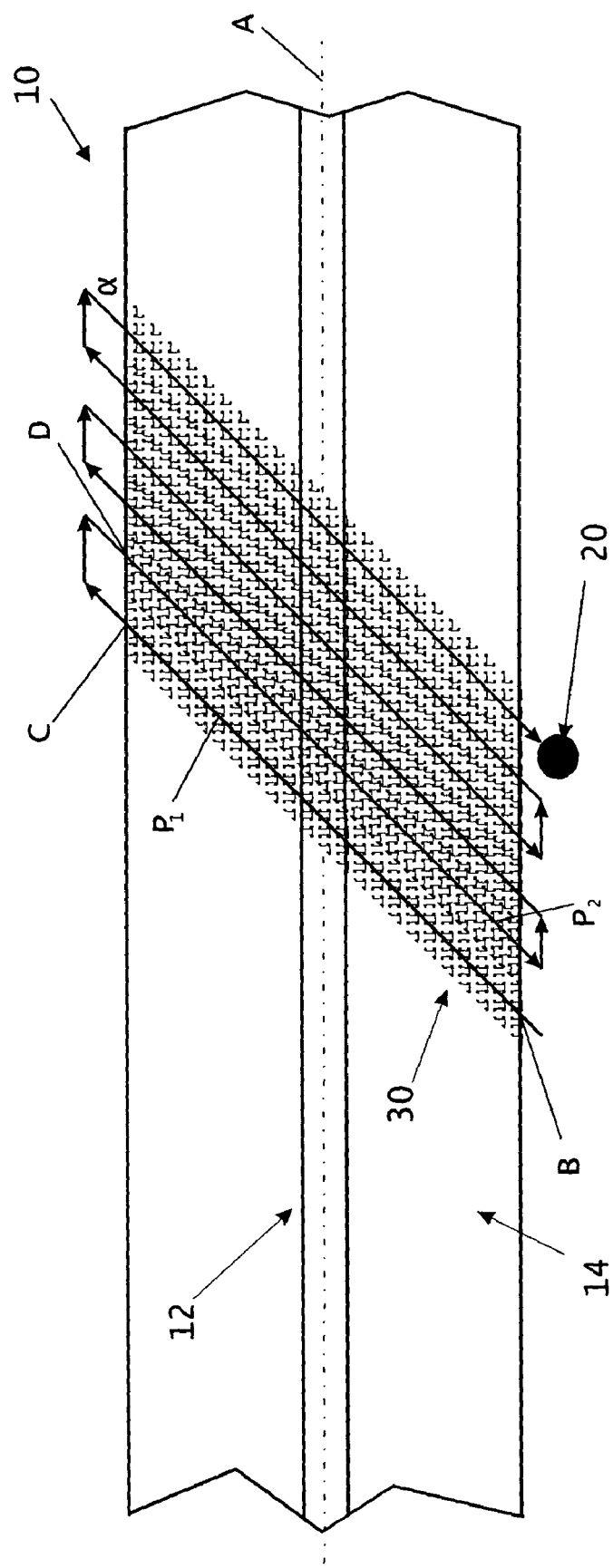
FIG. 5 is a top plan view of a fiber showing a method of achieving a zone of altered refractive index characteristics which is greater in width or thickness than the width of the laser beam used to create the zone.

As seen in FIG. 5, the laser beam 16 can be swept across the fiber 10 in a path that not only crosses the fiber but also moves longitudinally thereof, thereby creating an altered zone 30 which has a width or thickness that is a multiple of the beam width. Each sweep adds a thickness or width to the zone equal to a beam width. Thus, it is seen that the laser beam focal region 20 starts at the point B, sweeps across the fiber along a path $P_1$ which is at an angle α to the longitudinal axis A to the point C at the other side of the fiber. It then is shifted longitudinally by a distance generally equal to a beam width to point D and then it is swept back across the fiber along the path $P_2$, parallel to the path $P_1$. This sweeping pattern is followed until the zone 30 of altered refractive index characteristics of a desired width or thickness is achieved.

Figure 6:
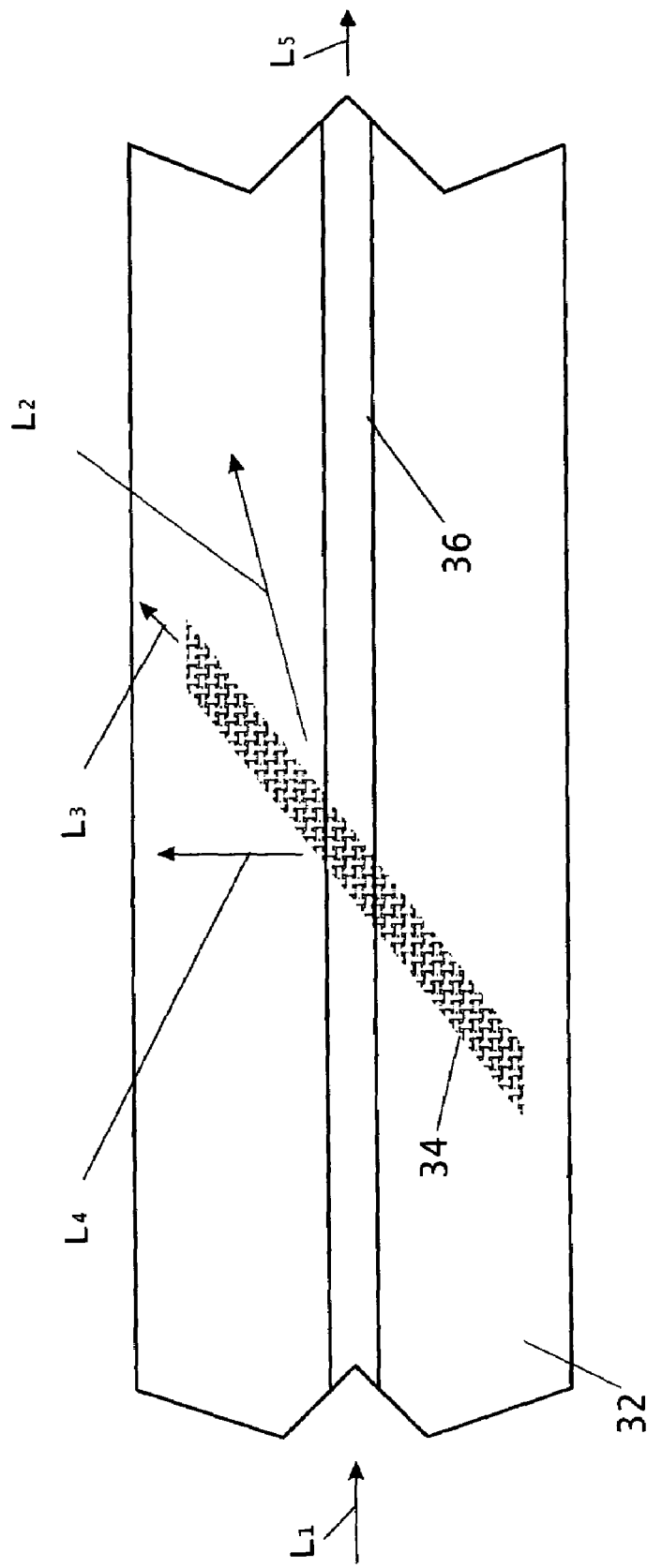
FIG. 6 is a top plan view of a waveguiding device or fiber having an angled zone of permanently altered refractive index characteristics therein, illustrating the effect thereof on light transmitted along the core, the device being used as an attenuator.

FIG. 6 is a top view of an optical fiber waveguiding device 32 having a zone 34 therein of permanently altered refractive index characteristics, created using one of the procedures previously described. FIG. 6 illustrates the effect of such a zone on light that is normally being transmitted along the core 36. When the transmitted light $L_1$ encounters the zone 34 a portion $L_2$ thereof will be scattered into the cladding; another portion $L_3$ will be guided outwardly along the altered zone 34; and yet another portion $L_4$ will be reflected as Fresnel reflected light. The remainder $L_5$ of the transmitted light $L_1$ will continue along the core on the other side of the altered zone 34. It is possible to use the properties of the altered zone to create devices which serve a useful purpose and can be utilized in other structures. In particular, new attenuators, taps and polarimeters are possible based on the principles of the present invention.

PRACTICAL APPLICATIONS

All-fiber Attenuator

Figure 7:
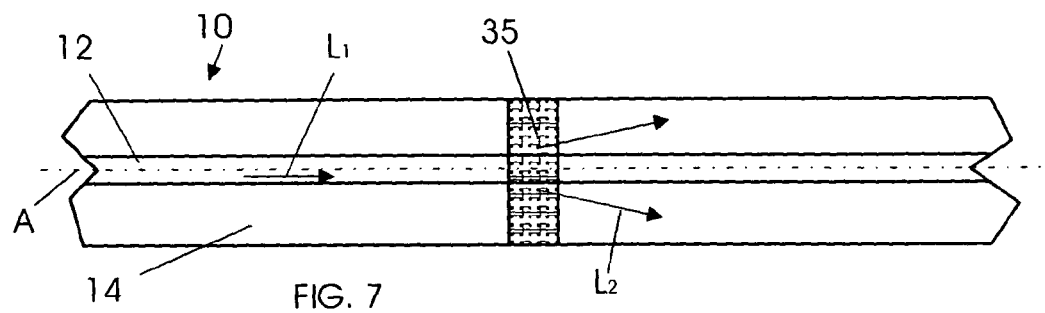
FIG. 7 is a top plan view of a waveguiding device or fiber having a zone of permanently altered refractive index characteristics therein, perpendicular to the longitudinal axis, illustrating the effect thereof on light transmitted along the core, the device being used as an attenuator.

An all-fiber attenuator is an optical waveguide or fiber which attenuates light propagating in the core. The attenuation is achieved by letting a portion of the light escape from the core, which is in turn achieved by creating an altered refractive index zone at the escape location. The altered zone may be created at an acute angle to the longitudinal axis of the optical waveguide or fiber (FIG. 6) or substantially perpendicularly to the longitudinal axis (FIG. 7). The altered zone 34, 35 may include refractive index changes in the core-cladding boundary region, in the evanescent region in the cladding, and/or in the core of the optical waveguide or fiber. In the embodiment of FIG. 7 refractive index changes in the core-cladding boundary region and in the evanescent region in the cladding lead to a coupling between the core and the cladding propagation modes and therefore to part of the light $L_1$ propagating in the core escaping into the cladding. In the embodiment of FIG. 6 refractive index changes in the core perturb the light $L_1$ propagating in the core and part of it is scattered out of the core via two escape mechanisms. The first escape mechanism scatters part $L_3$ of the light out of the core by coupling it to the waveguide formed by the altered zone 34 which is oriented at an acute angle to the longitudinal axis of the optical waveguide or fiber. The second scattering mechanism scatters part $L_4$ of the light out of the core by way of Fresnel reflection at the surface of the altered zone 34 which is oriented at an acute angle to the longitudinal axis of the optical waveguide or fiber. The surface of a suitably oriented altered zone acts therefore as a reflecting surface.

The achievable attenuation loss is between 0–40 dB depending on the length of exposure time for making the altered zone, the light pulse energy, the sweeping speed of the laser beam, the distance the write beam has been swept across the optical fiber, and the angle that the sweeping direction makes with respect to the longitudinal axis of the optical waveguide or fiber. Typically, losses due to altered refractive index zones can be as high as 40 dB with an accuracy of 0.05 dB.

In a preferred embodiment of an all-fiber attenuator, the loss can be accurately adjusted using a combination of loss induced with the refractive index changes in the core-cladding boundary region and loss induced with refractive index changes in the evanescent region in the cladding. At losses greater than 0.1 dB, the greater part of the loss can be induced with the refractive index changes in the core-cladding boundary region and fine adjustments to the loss in approximately 0.1 dB increments can be induced with refractive index changes in the evanescent region in the cladding.

In another embodiment of an all-fiber attenuator, the loss may be induced by sweeping the laser beam substantially parallel to the optical fiber and centered in the evanescent region in the cladding, in the core-cladding boundary region, or in the core. In this embodiment, typically the magnitude of the loss depends on the sweeping distance up to a loss of less than 1 dB for a single sweep, where the magnitude of the loss saturates for laser beam waist diameters of 10–20 micrometers. Within this limit, the loss can be adjusted by changing the length of the altered zone along the length of the optical waveguide or fiber.

When the loss has been induced by creating an altered zone at a small angle to the longitudinal axis of the optical waveguide or fiber, the achievable loss can be greater than 30 dB. Typically, even for such very high loss, the optical return loss is better than 40 dB, i.e. the intensity of light propagating in the core in the backward direction is more than 40 dB below the intensity of the light propagating in the core in the forward direction.

All-Fiber Tap

An all-fiber tap is an optical waveguide or fiber which couples a small portion of the light out of the core and out of the optical waveguide or fiber, which light can then be measured with an optical power detector such as a photodiode or a photomultiplier tube. See for example the arrangements shown in FIGS. 8 and 9. In fact an optical tap can form the basis for a power monitor in which the detector is used to collect light from the tap and to send a signal indicative of power level to an appropriate information retrieval device.

With all-fiber taps light is coupled out of the core using similar altered zones as in the above described case of an all-fiber attenuator, although the portion of the light coupled out of the core in the case of an all-fiber tap is typically much smaller with a tap ratio of typically 1%. The all-fiber tap therefore allows for the monitoring of the amount of light propagating in the core by monitoring the amount of light coupled out of the optical waveguide or fiber at the expense of diverting only a small amount of light.

Figure 8:
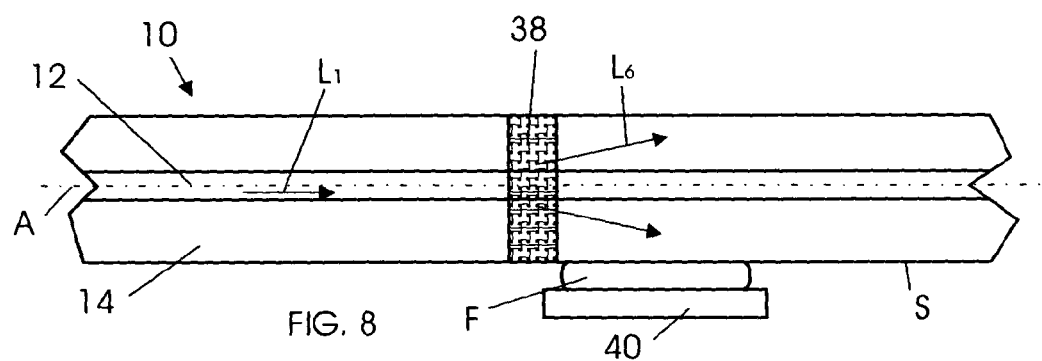
FIG. 8 is a top plan view of a waveguiding device or fiber having a zone of permanently altered refractive index characteristics therein, perpendicular to the longitudinal axis, illustrating the effect thereof on light transmitted along the core, the device being used as a tap.
Figure 9:
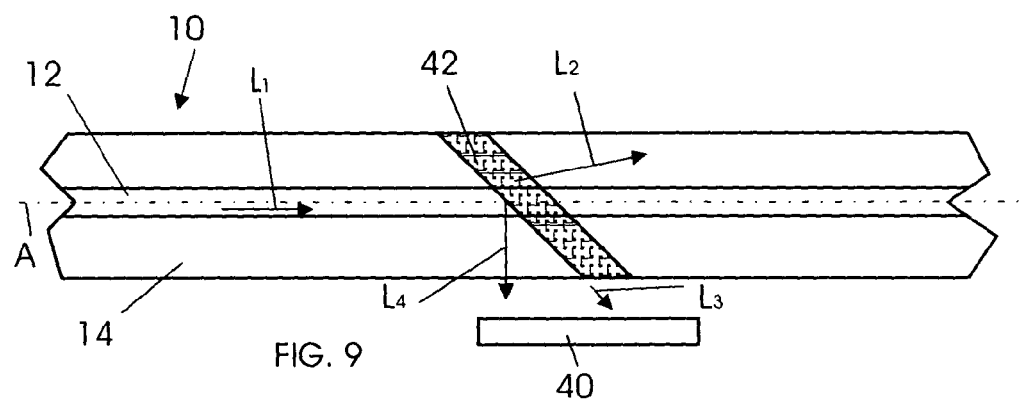
FIG. 9 is a top plan view of a waveguiding device or fiber having an angled zone of permanently altered refractive index characteristics therein, illustrating the effect thereof on light transmitted along the core, the device being used as a tap.

Referring to FIG. 8, if the altered zone 38 is oriented perpendicularly to the longitudinal axis A of the optical waveguide or fiber 10 then the light $L_6$ coupled out of the core is at a grazing angle to the surface S of the optical waveguide or fiber, and index matching fluid F can be used to avoid total internal reflection at the surface of the optical waveguide or fiber, and to allow the light to escape from the optical waveguide or fiber and be detected by an optical detector 40. Referring to FIG. 9, if the altered zone 42 is oriented at a sufficiently large angle to the longitudinal axis A of the optical waveguide or fiber 10 then index matching fluid can be omitted, since the light coupled out of the core may be at a larger angle than the critical angle for total internal reflection, thereby avoiding total internal reflection at the surface of the optical waveguide or fiber.

The optical return loss for all-fiber taps is greater than 40 dB.

All-Fiber Polarimeter

An all-fiber polarimeter is an optical waveguide or fiber capable of measuring the polarization states of the light propagating in its core. To this end, a number of reflecting surfaces must be oriented substantially at a Brewster angle to the longitudinal axis of the optical waveguide or fiber, such that mainly s-polarized light will be reflected with negligible amount of p-polarized light reflection. Spacing the azimuthal angle of four reflecting surfaces along the length of an optical waveguide or fiber by 45 degrees allows for the measurement of all four Stokes parameters, thereby specifying the complete polarization state of the light propagating in the core. A prior art all-fiber polarimeter by Westbrook, Strasser, and Erdogan uses a blazed fiber Bragg grating for each of the reflective surfaces (IEEE Photonics Technology Letters, Vol. 12, No. 10, pp. 1352–1354, October 2000).

Figure 10:
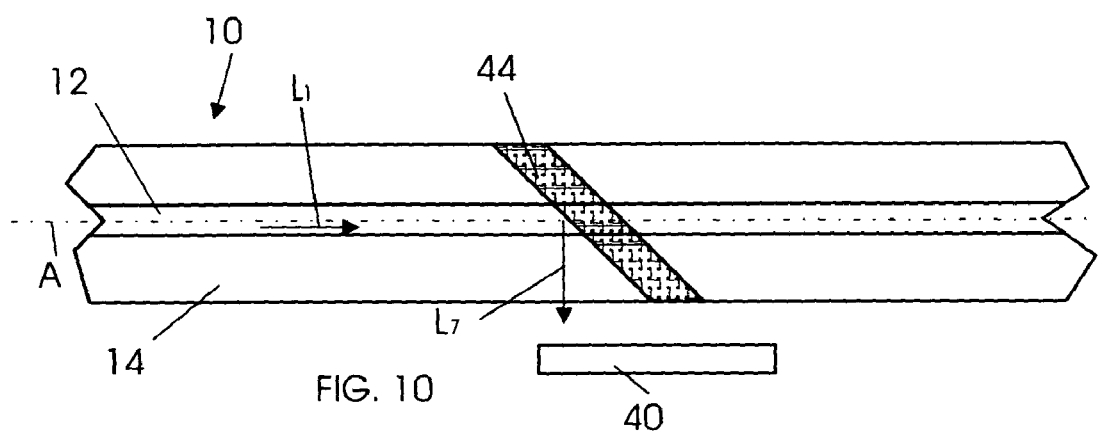
FIG. 10 is a top plan view of a waveguiding device or fiber having an angled zone of permanently altered refractive index characteristics therein, illustrating the effect thereof on light transmitted along the core, the device being used as a polarimeter.
Figure 12A:
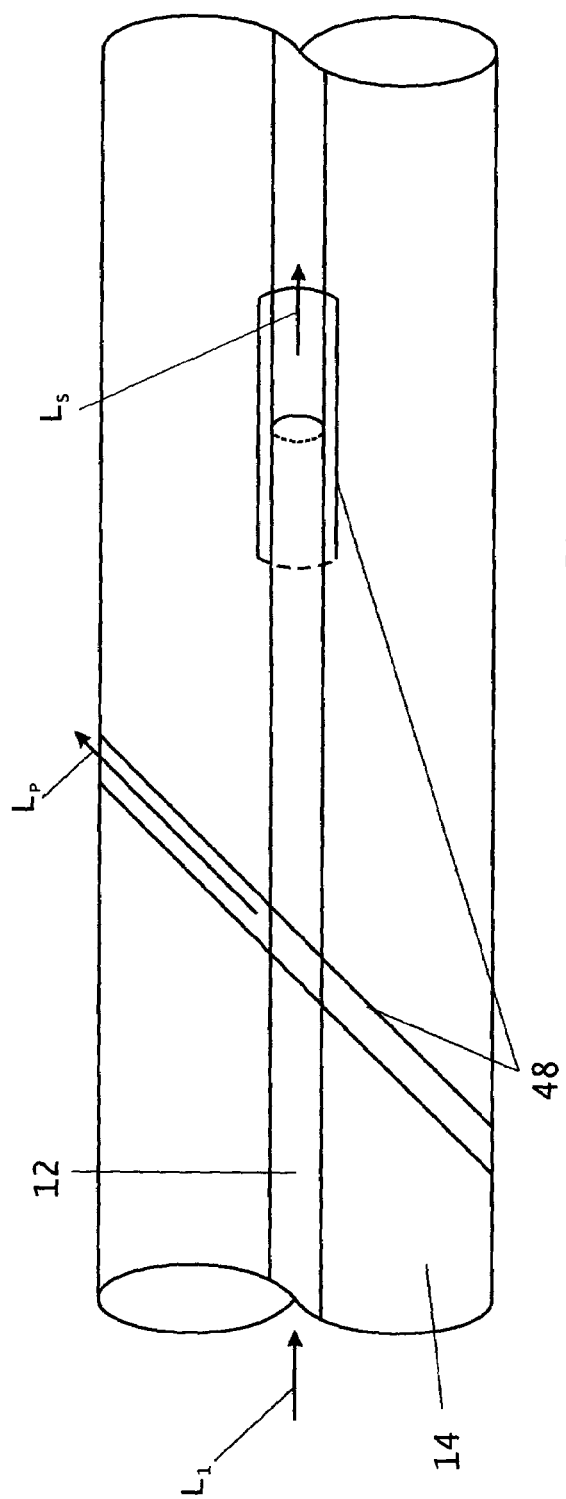
FIG. 12A is a top plan view of a polarimeter having two identical altered zones therein.
Figure 12B:
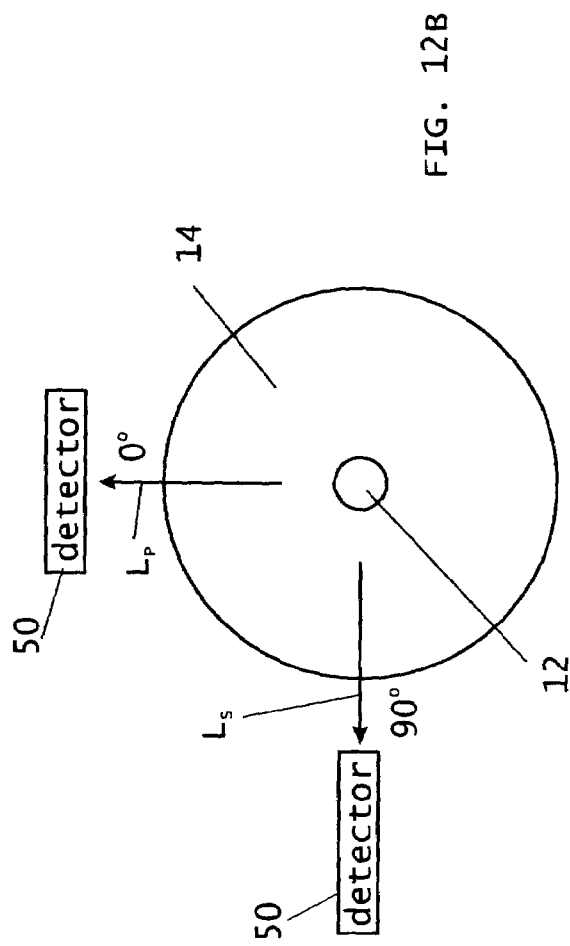
FIG. 12B is an end view of the polarimeter of FIG. 12A.

With reference to FIG. 10, an embodiment of an all-fiber polarimeter according to this invention implements each of the four reflective surfaces with an altered zone, taking advantage of the reflective properties of the surface of an altered zone. For the sake of simplicity only one altered zone 44 is shown in the figure. The Brewster angle of an altered zone depends on the pulse energy, the pulse width, the pulse repetition rate, the sweep speed, and the size of the waist of the write beam. A reflecting surface with a Brewster angle of 45 degrees which conveniently reflects s-polarized light $L_7$ in a direction perpendicular to the longitudinal axis A of the optical waveguide or fiber will have minimal contamination of p-polarized light. As shown in FIGS. 11A and 11B a polarimeter is shown with four altered zones $44_1$, $44_2$, $44_3$ and $44_4$ at substantially 90 degrees to each other. A $\lambda/2$ wave plate 46 may be inserted between a pair of adjacent altered zones, such as the third and fourth altered zones $44_3$, $44_4$, to distinguish between right and left circularly polarized light. To this end, a UV-induced $\lambda/2$ wave plate as in the quoted IEEE reference may be used. With the $\lambda/2$ wave plate in the core, circularly polarized light will or will not be reflected by the fourth altered zone, depending on the direction of rotation of the E-vector of the light propagating in the core. The polarization axis of the $\lambda/2$ wave plate can be oriented either along or at a right angle to the s-polarized direction of the fourth altered zone. Another embodiment of an all-fiber polarimeter, as shown in FIGS. 12A and 12B, uses two identical altered zones 48, 48 with the azimuthal angles spaced at substantially 90 degrees, and p-polarized light for the first reflecting surface is therefore s-polarized for the second reflecting surface. The light intensity of both polarization states in the fiber core may therefore be measured independently, although the full polarization state cannot be determined with only two reflecting surfaces. A slight deviation from the orthogonal azimuthal angles will balance the polarization dependence of the two zones, thereby reducing polarization-dependent losses. Both embodiments are shown with suitable detectors 50 for detecting the light directed outwardly by the associated altered zones.

The return loss for all-fiber polarimeters is greater than 40 dB.

It should be noted that certain losses in an attenuator and that polarization dependent tapping in a tap can be compensated for by including at least two altered refractive index zones within the attenuator or tap, with the zones being oriented relative to each other to achieve the desired degree of compensation. Such zones could be created by sweeping the beam through the workpiece from, for example, left to right, and then again (at the same relative angle) from top to bottom, possibly at the same location.

THE LASER

A suitable type of ultrafast pulsed laser for producing a beam according to this invention is a laser emitting pulses each with a duration of less than 1 picosecond, preferably between 2 and 200 femtoseconds, and more preferably about 100 femtoseconds, and a pulse energy between 1 nanojoule and 1 millijoule. The laser can be operated using single pulses or with a variable pulse repetition rate between 500 Hz and 1 GHz, preferably between 1 kHz and 100 MHz. The laser repetition rate is selected to be higher than the thermal diffusion time out of the modified volume element to allow heat to accumulate between laser shots to soften the glass, ideally up to the liquefying point or glass temperature of the material, to enable the material to deform to the photoinduced changes in charge distribution and temperature profile. This accumulated heating effect both enables material flow to create the index of refraction changes and self anneals out stress within the written zone. For 10 micron diameter focal regions the typical thermal diffusion time is on the order of 10 microseconds. For such cases, the ideal laser repetition rate is greater than 100 KHz to provide pulses at time intervals shorter than 10 microseconds. In general, the higher the repetition rate the better; however, practical limitations in laser average power, limit this prospect as the size of the volume element being created in the material increases. Larger volume elements require higher pulse energy and thereby are limited to lower repetition rates for any given average power laser system. The conditions for approaching liquefication of the glass scale as the square of the beam diameter. In these cases, a second laser such as a $CO_2$ laser, can be used to heat the zone for increasing the compliance of the material to the writing laser. The wavelength of the light must be greater than that of the absorption region of the glass material in which a refractive index change is to be made. In the case of standard fused silica glass, which is commonly used in the manufacture of optical waveguides and fibers, the wavelength of the light must therefore be greater than 200 nanometers. The laser for this application is typically based on a Ti:Sapphire, Chromium doped, or Erbium doped solid state mode-locked laser oscillator. Depending on the energy of the light pulses required for exposing the glass materials, the light pulses from the laser oscillator may also be amplified through an amplifier stage based on one or more of similar solid state laser media with broadband gain. The output from either the laser oscillator or the amplifier may also be used to pump an optical parametric amplifier to generate the light pulses used to expose the glass materials.

A preferred laser system for this invention is therefore one in which the output of a frequency-doubled Erbium doped fiber laser is amplified in a laser regerative amplifier that is based on a Ti:Sapphire gain material, providing light pulses of approximately 100 femtosecond duration each with an energy of between 1 nanojoule and 1 millijoule at a pulse repetition rate of between 1 kHz and 100 MHz. The laser light source beam diameter should be in the range of >0.1 to about 10 mm; the focal length should be in the range of about 1 mm to about 30 cm; and the numerical aperture of any lens or mirror utilized therewith should be in the range of about 0.05 to about 1.3.

As indicated above, the laser light can be focused with a lens or a mirror, thereby creating very high intensity light in the focal region. At peak pulse intensities at or above the threshold for inducing permanent refractive index changes, which is about $10^{10}$ W/cm$^2$, the focal region can be used as a write beam. By moving the write beam relative to the glass material to be written into, the microstructure of the glass will be restructured to create a defined zone having permanently altered refractive index characteristics. The altered zone can be created by pin-point focusing, or line focusing, of the beam at a target region in the workpiece or by sweeping the write beam over the target region. The altered zone can be created in a variety of optical waveguides and fibers, including any glass substrate with an embedded optical waveguide, conventional optical fibers, polarization maintaining fibers, optical fibers with Germanium enriched core, optical fibers with rare-earth dopants either in the core or in the cladding region, hydrogen loaded optical fibers, optical waveguides and fibers having more than one core, such as the waist region of a taper coupler, optical waveguides and fibers having more than one cladding, such as W-fibers, holey fibers (photonic crystal fibers), fiber Bragg gratings, photonic bandgap materials, glasses doped to provide multiphoton resonance for improving laser writing performance by decreasing laser thresholds for material modification, and other optical waveguides and fibers with complicated refractive index profiles.

ADDITIONAL PROCEDURAL CONSIDERATIONS AND MODIFICATIONS

One method for accurately creating altered zones in optical waveguides or fibers having a core has the optical waveguide or fiber mounted on a high precision stage with better than 1 micron positioning accuracy. The focal region of the laser beam is aligned with the core using the following alignment procedure.

The peak pulse intensity of the laser source is first set at low power to avoid making permanent refractive index changes to the glass during the alignment procedure. The laser beam is oriented at a desired angle relative to the longitudinal axis of the core, depending on the desired shape of the altered zone to be created. The focal region is scanned over the optical waveguide or fiber, and a photomultiplier tube is used to detect the amount of multiphoton fluorescence from the core. The location of the focal region is optimally aligned to the location of the core when the detected amount of multiphoton fluorescence is at a maximum. Using the optimum alignment as a spatial reference, the focal region is then moved, after the peak pulse intensity has been increased to at least the threshold for inducing permanent refractive index changes, to create altered zones in the optical waveguide or fiber. The laser beam can be directed towards the workpiece "from above", "from below", or "from the side" referring to a setup wherein the focal region of the laser source is initially positioned above, below, or to one side of the optical waveguide or fiber mounted in the precision stage. When directing the laser beam "from above", for example, the focal region is initially positioned above the optical waveguide or fiber, and moved downwards.

Using two or more laser sources, or a single source whose output beam is split into two or more beams, allows for collision of the beams, i.e. the focal regions of the multiple beams intersect in the glass material such that the combined peak pulse intensity reaches threshold only in the intersect or target region, thereby improving the localization of the refractive index change. The alignment procedure is similar to the above, only the maximum fluorescence is now indicative of the focal regions being aligned relative to each other and to the core. The focal regions are then either moved in unison for creating the altered zone, or the workpiece is moved with respect to the focal regions.

The use of multiple beams for creating the altered zones in the workpiece should provide better resolution and potentially a more homogeneous zone of altered refractive index characteristics. Also, with multiple beams there is the potential to take advantage of interferometric effects to create specific types of altered zones, including for example, micro-gratings.

While the foregoing describes methods using one or more moving beams or a moving workpiece, it should be understood that altered zones can be created without relative movement between the beam(s) and the workpiece as long as the focal region of the beam(s) can be located with pin-point accuracy at a predetermined target region within the workpiece.

Other beneficial material modification techniques that fall within the scope of this invention can be used for femtosecond-pulse-assisted microstructuring of an optical waveguide. In general, these special techniques involve the addition of externally applied stimuli to the femtosecond-pulse microstructuring methods described already in this specification. Combining additional stimuli together with femtosecond pulse exposure increases the functionality of femtosecond-pulse-modified optical-waveguide technology, as described below.

Specifically, the purpose of applying external stimuli to the optical waveguide during femtosecond-pulse microstructuring of an optical waveguide is, in a first instance, to create permanent regions of stress and/or stress birefringence in and around the femtosecond pulse modified region of the optical waveguide. In a second instance, the purpose is to build in a permanent electric field in and around the modified region of the optical waveguide.

In order to understand how stress and/or an electric field can be introduced in and around the femtosecond-pulse-modified region of the optical waveguide, it is necessary to examine the heat transfer dynamics that occur when the waveguide material (glass) (partially) absorbs the energy of a femtosecond pulse that has been focused in the material. For simplicity, the femtosecond pulse focal spot can be characterized by a radius, $a_{rad}$. Assume that the waveguide material has a thermal diffusivity constant, K. Assume further that the energy of the femtosecond pulse is uniformly deposited within the spherical volume of material bounded by the radius, $a_{rad}$. Set for discussion purposes $a_{rad}$=10 μm. The characteristic time constant for diffusion of the thermal energy deposited by the pulse is, approximately, 0.1 $a_{rad}^2$/K.

For fused silica at 100° C. the thermal diffusivity coefficient K is 0.0082 cm$^2$/sec. Therefore the characteristic time constant for diffusion of the thermal energy (for a 10 μm focal spot) in fused silica is approximately 1.2×10$^{-5}$ sec. Heat dissipation from the focal spot by blackbody radiation for temperatures below 1500° C. can be neglected. Therefore, the focal spot in the material loses energy mainly by heat diffusion; of course, processes associated with a rearrangement of the material lattice within the focal spot retain some of the pulse energy. The lattice modification energy leads to refractive index modification, as already discussed.

If a train of femtosecond pulses is incident in and around the focal region that overlaps a first pulse, and the pulse train has a pulse repetition period shorter than about 1.2×10$^{-5}$ sec (for this example), then the condition is reached where the thermal energy in the focal volume is accumulated at a faster rate than it is dissipated, thereby leading to an increase in the temperature of the focal region. Thus, the energy per femtosecond pulse, the femtosecond pulse repetition rate and the radius of the focal spot, together control the temperature of the material in and around the focal spot.

To introduce permanent stress/stress-birefringence in an optical waveguide stress is applied to the waveguide during the femtosecond pulse processing up to a value below the (tension/compression) fracture strength of the material. Femtosecond processing conditions (energy per femtosecond pulse, the femtosecond pulse repetition rate and the radius of the focal spot) are set in such a way that the material temperature in and around the focal spot is controlled to a value in the vicinity of, or above, the softening temperature of the waveguide glass. It will be realized that the waveguide region processed by femtosecond radiation does not support stress while the temperature of the region remains above the softening point of the glass. When the externally applied stress is removed, following femtosecond processing of the waveguide, the stress distribution in the material changes. The applied stress in the material surrounding the exposed region will tend to relax and in so doing will stress the exposed region of the glass, which now retains a condition of permanent stress because the glass in the exposed region has cooled to its operating temperature, which normally is well below the softening point of the glass. It is well known that localized internal stress in glass leads to optical birefringence in and around the stressed region.

This apply-stress-while-writing method can be used to subject the core of an optical fiber to directional stress by tensioning/compressing the fiber while writing longitudinal stress members adjacent and parallel to the core of the fiber with a femtosecond pulse train. It can also be used to render birefringent waveguides written with a femtosecond pulse train by applying a transverse stress to the waveguide region during the writing process.

Figure 14A:
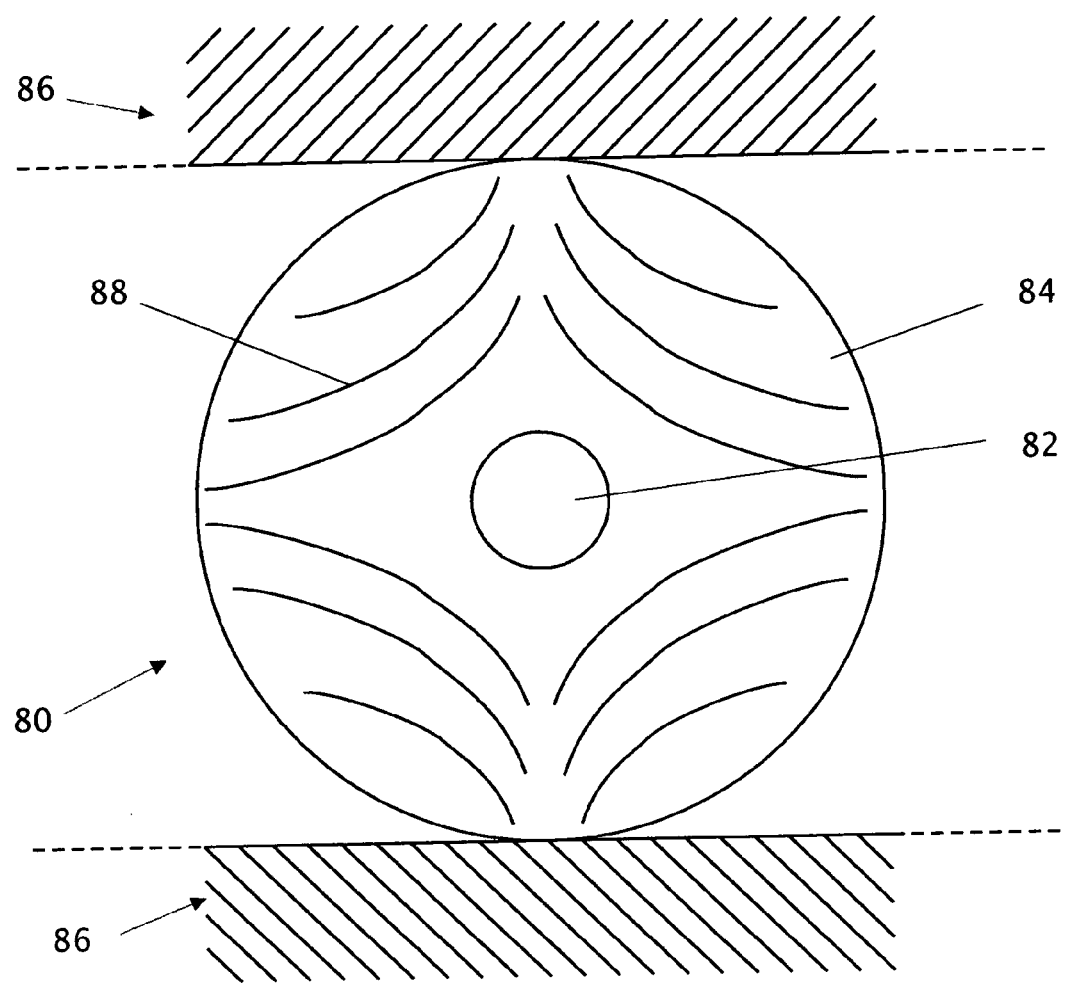
FIG. 14A is an end view illustrating the application of mechanical stress to an optical fiber.
Figure 14C:
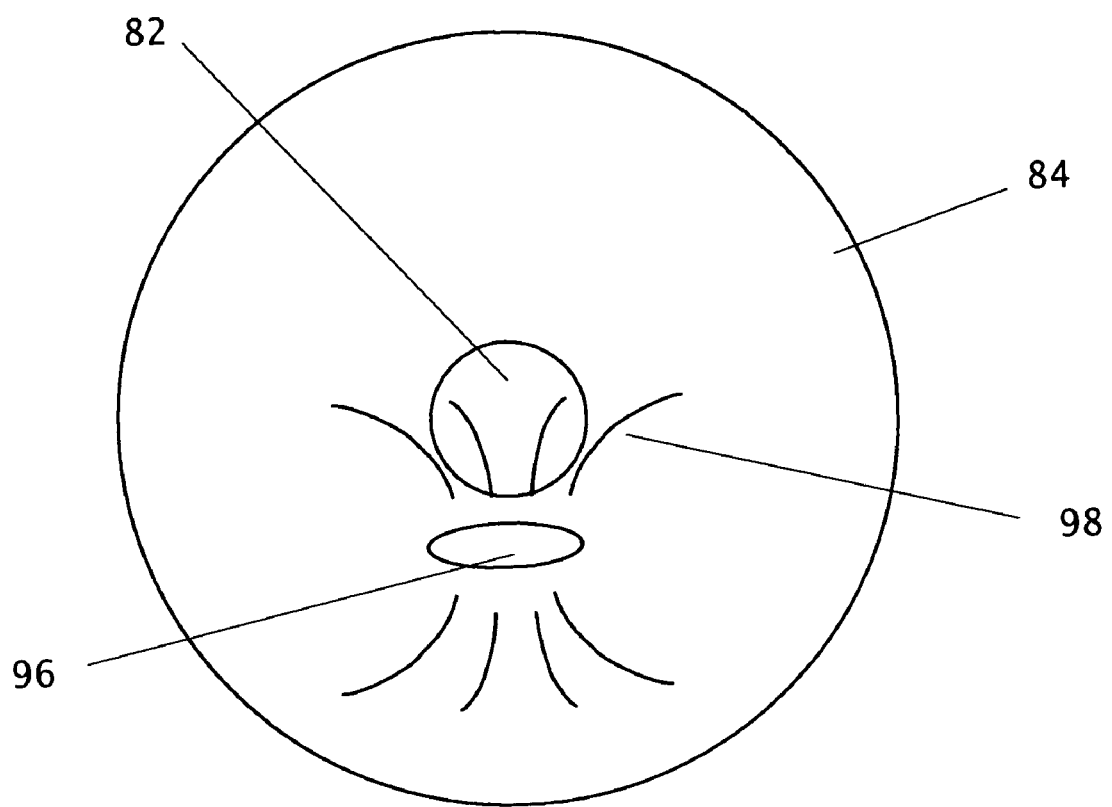
FIG. 14C is an end view illustrating an altered stress field within the fiber once the mechanical stress has been removed.

FIGS. 14A, B and C illustrate diagrammatically the application of stress with this invention. FIG. 14A shows an optical fiber (waveguide) 80 having a core 82 and cladding 84 within a clamping apparatus 86 that is capable of applying mechanical stress to the fiber. The result is a generally symmetrical stress field within the fiber, identified by stress lines 88. When a write beam 90 having a focal region 92 is applied to the waveguide as in FIG. 14B there will be localized heating in the target region as discussed hereinabove. This has the effect of relaxing the mechanical stress and redistributing the stress field in the vicinity of the focal region, as seen at 94. Once the write beam and mechanical stress are removed after writing the zone of permanently altered refractive index characteristics within the waveguide there will be an altered stress field as seen at 98, providing the desired optical birefringence.

Figure 15A:
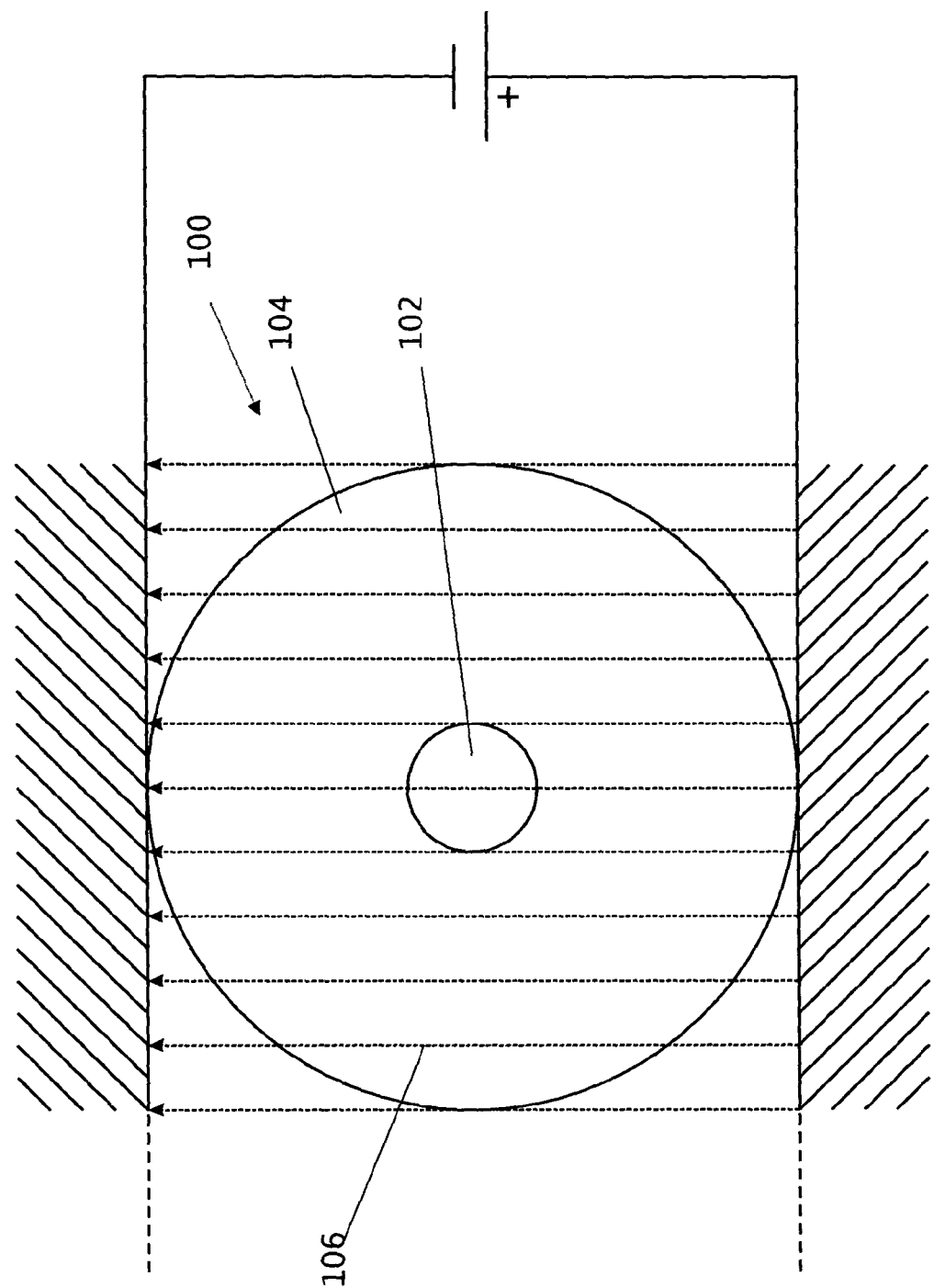
FIG. 15A is an end view illustrating the application of a strong electrical field to an optical fiber.
Figure 15B:
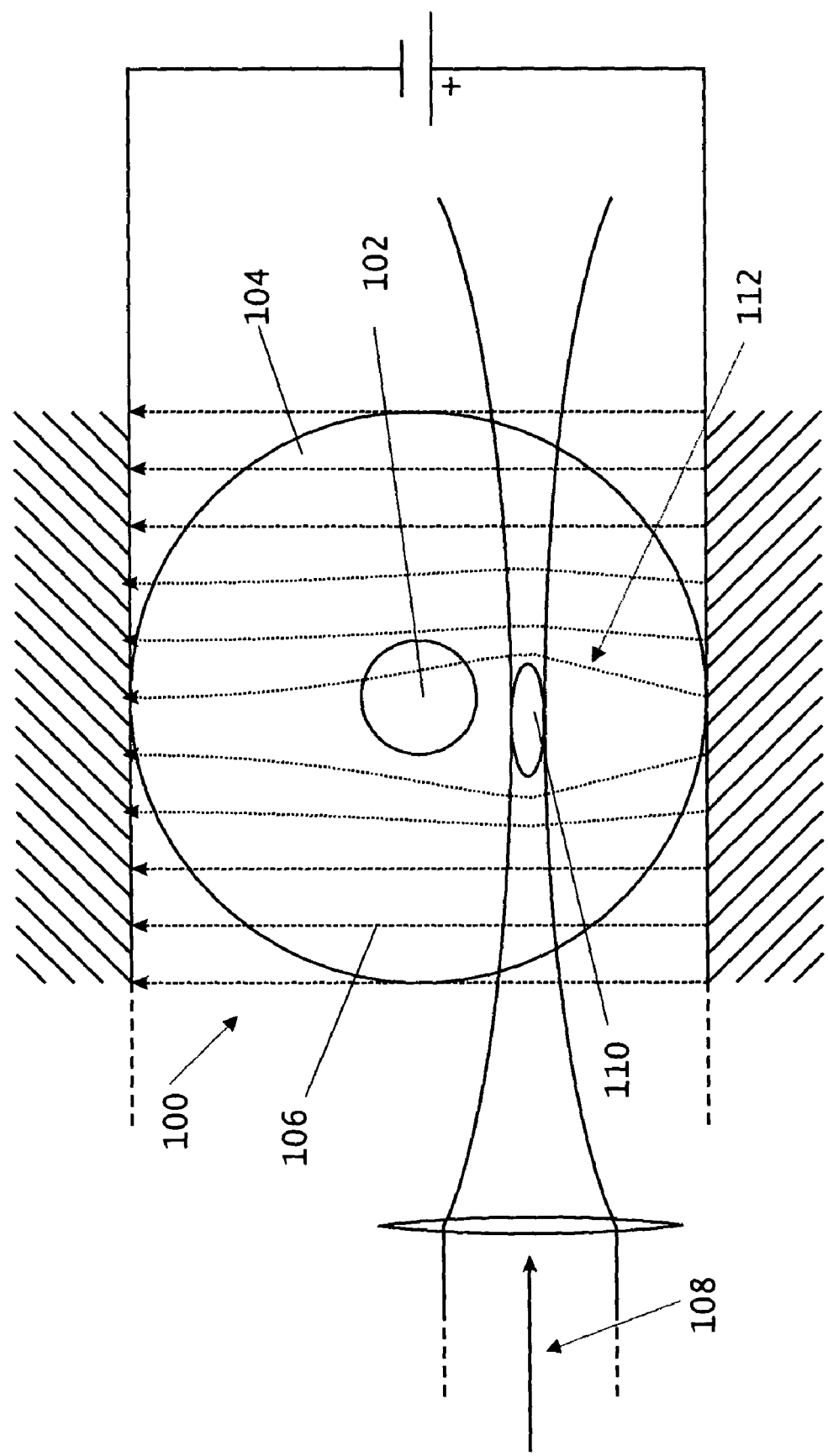
FIG. 15B is an end view illustrating the creation of a zone of permanently altered refractive index characteristics during the application of an external electrical field to the fiber.
Figure 15C:
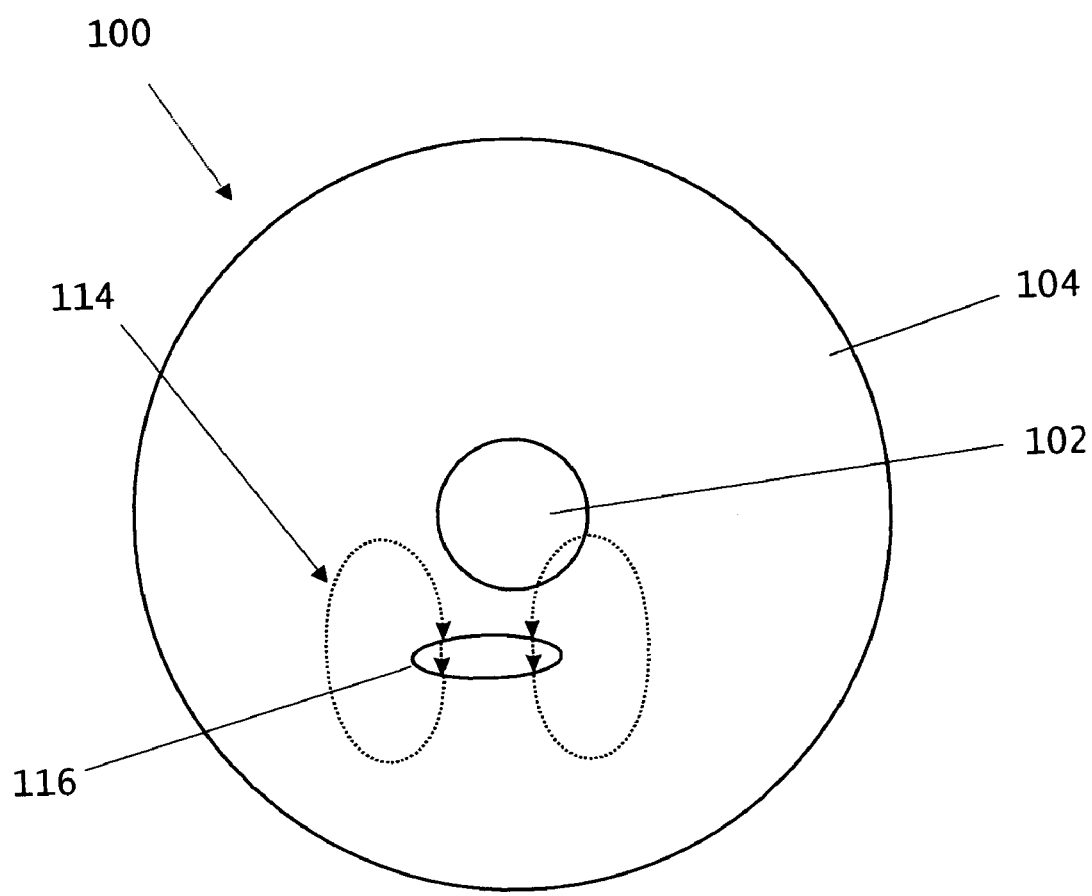
FIG. 15C is an end view illustrating a static polarization field within the fiber once the electrical field has been removed.

A similar approach to that used to induce permanent stress can be used to create an internal electric field in a femtosecond-modified region of an optical waveguide. See for example FIGS. 15A, B and C. FIG. 15A shows an optical fiber 100 having a core 102 and a cladding 104 positioned such that a strong electrical field, identified by 106, is applied thereto from top to bottom. This induces an electric polarization throughout the region of fiber over which the electric field is applied. This constant electric field, up to a magnitude comparable to the electrical breakdown field of the waveguide material, is applied during the femtosecond pulse modification process as seen in FIG. 15B. There it is seen that the write beam 108 has a focal region 110 which alters the electric field as at 112. Poling of the material when it is at a temperature in the vicinity of, or above, the softening temperature of the waveguide glass is facilitated by the high temperature. When the material cools, memory of the applied electric field is retained in the structure of the femtosecond pulse modified region of the material. Built-in or polled fields are used (in combination with periodic structures that phase match the process) for facilitating efficient nonlinear processes, such as second-harmonic generation. These are usually implemented by alternating the direction of the applied field during the writing process. Thus as seen in FIG. 15C after the write beam 108 and the external electric field have been removed there will be a static polarization field 114 in and around the femtosecond modified region 116 of the fiber. The write beam should be removed, allowing the altered region to solidify, before the electric field is removed.

Figure 13A:
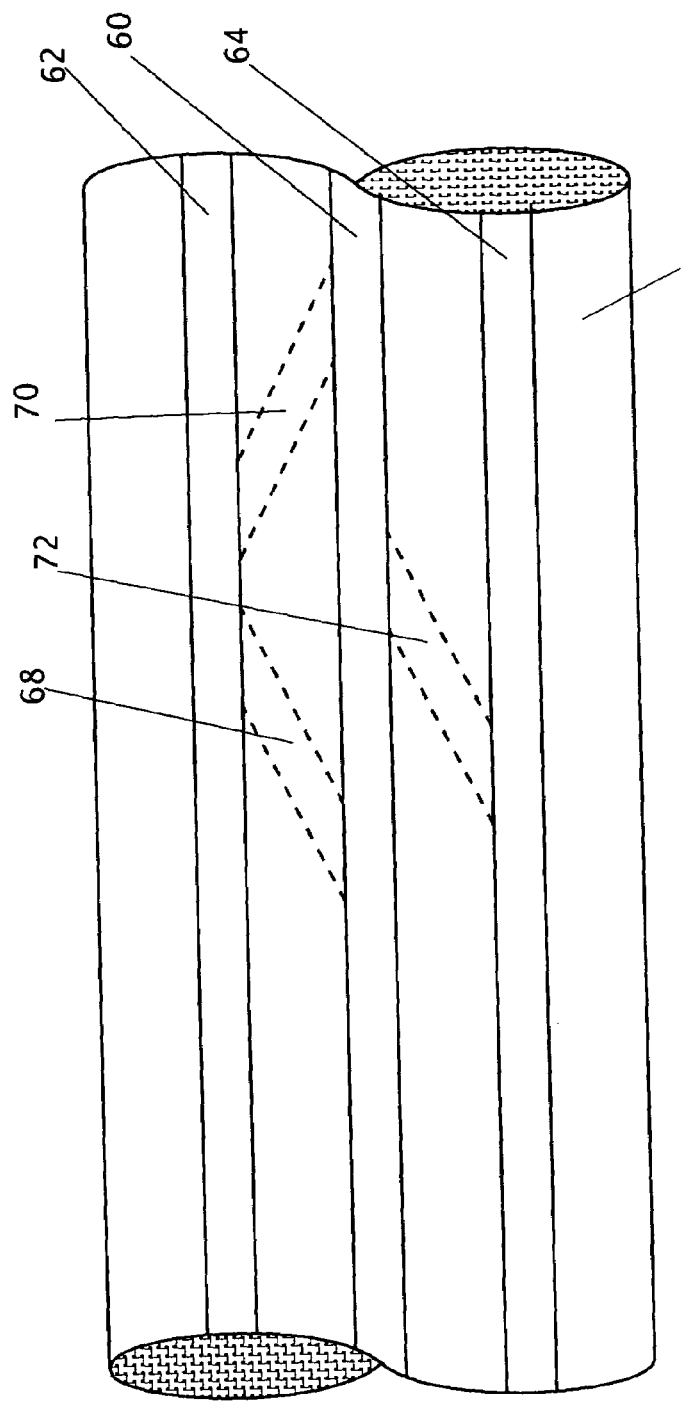
FIG. 13A is a top view of a fiber with multiple cores and with altered zones interconnecting various cores of the fiber.
Figure 13B:
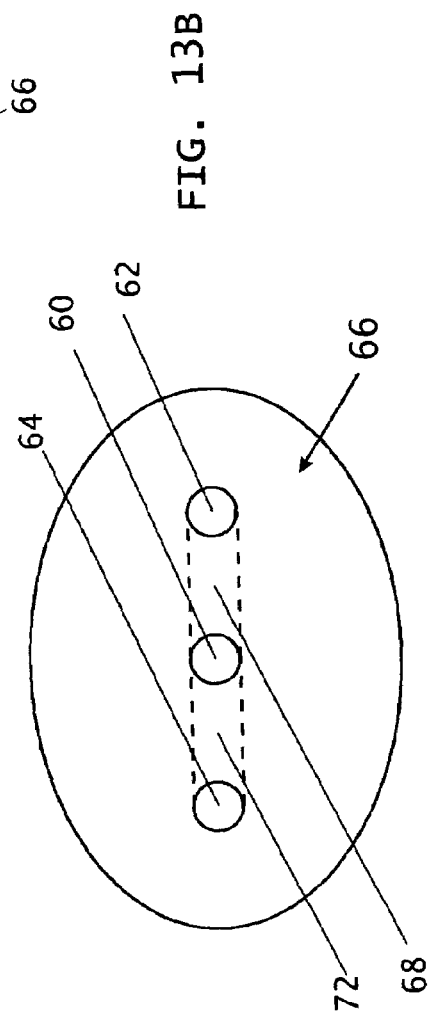
FIG. 13B is an end view of the fiber illustrated in FIG. 13A.

Based on the above-described methods to couple light into and out of a fiber core to an altered zone, it is possible to create more complex devices in multiple core fiber as shown in FIGS. 13A and 13B. As shown in the Figures, light coupled into or out of one or more of the cores may be channelled between the cores by altered region interconnects based on mechanisms described herein. Different cores may have different cladding structures (including multiple cladding structures and photonic bandgap structures), sizes, doping, and may alter light in different ways, including but not limited to phase shifts, dispersion, amplification, attenuation, and frequency conversion. Devices based on this method may include but are not limited to Mach-Zehnder interferometers, interleavers, add-drop filters, and arrayed waveguide gratings.

Another benefit of the present invention is found in the ability of improving the coupling between optical fibers or waveguides that have been altered in accordance with the present invention. With this invention the refractive index characteristics of the fiber or waveguide can be modified or altered at or near the interface point so as to match the characteristics of the fiber, waveguide or optical source to which it is to be coupled. Essentially, with this invention it is possible to substantially enlarge or reshape the waveguide's mode field pattern so as to reduce the divergence of the light exiting the waveguide.

A person skilled in the art will now readily appreciate the flexibility and versatility of the disclosed methods for writing altered zones in glass. To give an example for the flexibility of the disclosed methods: variations of the methods include the use of two or more laser sources which are moved independently from each other rather than in unison. To give an example for the versatility of the disclosed methods: the methods can be applied to specialty optical fibers, as distinct from conventional telecommunications fibers, which will apparently produce other novel products in addition to the novel all-fiber products disclosed. Variations of the described embodiments are therefore to be considered within the scope of the invention.

The invention claimed is:

1. A method for creating an optical waveguiding device from an elongated generally annular optical fiber made of glass material and having at least one core and at least one cladding by creating a zone of permanently altered refractive index characteristics in the optical fiber, using a focused beam which is generated by a pulsed laser light source having:
   (i) a wavelength greater than the absorption edge of the glass material;
   (ii) a pulse width of less than 1 picosecond, and a pulse energy of between 1 nanojoule and 1 millijoule; and
   (iii) capable of achieving a peak pulse intensity within a defined focal region;
   comprising the steps of:
   (a) aligning said laser beam focal region with a defined target region within the optical fiber, said target region extending through the core and at least partially through the cladding of the optical fiber, at an acute angle to a longitudinal axis thereof;
   (b) providing relative movement between said optical fiber and said beam such that said laser beam focal region sweeps along said target region; and
   (c) operating said laser light source with the peak pulse intensity thereof and a repetition rate thereof selected to accumulate heat and to soften the glass material within the target region and to thereby induce permanent refractive index changes in the optical fiber within the target region;
   said optical waveguiding device exhibiting controlled polarization sensitivity.

2. The method according to claim 1 wherein said step (c) comprises the steps of:
   (d) reducing said peak pulse intensity to below the threshold for inducing permanent refractive index changes in said optical fiber;
   (e) orienting said focal region to be substantially perpendicular to a longitudinal axis of said at least one core;
   (f) sweeping said beam focal region over said optical fiber along said target region while measuring multiphoton fluorescence from said at least one core, such that a maximum fluorescence level is indicative of location alignment of said beam focal region with said at least one core; and
   (g) using said orientation and location alignments as spatial references for sweeping said beam focal region along said target region, while setting said peak pulse intensity to at least the threshold for inducing permanent refractive index changes in said optical fiber, to create said zone, said zone having an orientation and location within said optical fiber corresponding to the orientation and location respectively of said target region.

3. The method according to claim 2 wherein said pulsed laser light source is operated at a pulse repetition rate of between 500 Hz and 1 GHz.

4. The method according to claim 1 wherein said laser light source is a laser system in which the output of a frequency-doubled Erbium-doped fiber laser is amplified in a laser regenerative amplifier that is based on a Ti:Sapphire gain material.

5. The method according to claim 1 wherein said beam has a diameter of from 0.1 to 10 micrometers at the focal region.

6. The method according to claim 1 wherein said focused pulsed laser light is focused with a lens, axicon, focusing mirror, or combinations thereof to achieve desired spatial relationship of the focal regions with respect to the target region.

7. The method according to claim 6 wherein said lens, axicon, or focusing mirror has a focal length from 1 to 30 mm and a numerical aperture from 0.05 to 1.3.

8. The method according to claim 1 wherein said pulse width is less than 200 femtoseconds.

9. The method according to claim 3 wherein said pulse repetition rate is from 1 kHz to 100 MHz, said repetition rate being selected based on laser parameters and glass material properties to deliver pulses faster than the thermal diffusion time of the target region so as to allow heat to accumulate and soften the glass material.

10. The method according to claim 1 wherein said peak pulse intensity threshold for inducing permanent refractive index changes is at least $10^{10}$ W/cm$^2$.

11. The method according to claim 1 wherein said optical fiber is selected from the group of optical fibers consisting of: a conventional optical fiber; a polarization maintaining optical fiber; an optical fiber with a Germanium enriched core; a hydrogen deuterium loaded optical fiber; a W-fiber; a multiple cladded fiber; a photonics crystal fiber; intersecting optical fibers; a taper coupler; and a rare earth doped fiber.

12. A method for creating an optical waveguiding device from an elongated generally annular optical fiber made of glass material and having at least one core and at least one cladding by creating a zone of permanently altered refractive index characteristics in the optical fiber, using focused beams generated by at least two pulsed laser light sources, each having:
  (i) a wavelength greater than the absorption edge of the glass material;
  (ii) a pulse width of less than 1 picosecond, and a pulse energy of between 1 nanojoule and 1 millijoule; and
  (iii) capable of achieving a peak pulse intensity within a defined focal region;
  comprising the steps of:
  (a) aligning each said laser beam focal region with a defined target region within the optical fiber, said target region extending through the core and at least partially through the cladding of the optical fiber, at an acute angle to a longitudinal axis thereof;
  (b) providing relative movement between said optical fiber and said beams such that said laser beam focal regions sweep along said target region; and
  (c) operating said laser light sources with the combined peak pulse intensity thereof and a repetition rate thereof selected to accumulate heat and to soften the glass material within the target region and to thereby induce permanent refractive index changes in the optical fiber within the target region;
  said optical waveguiding device exhibiting controlled polarization sensitivity.

13. The method according to claim 12 wherein said step (c) comprises the steps of:
  (d) reducing said peak pulse intensity of each laser light source such that the combination of the peak pulse intensities is below the threshold for inducing permanent refractive index changes in said optical fiber;
  (e) orienting each of said focal regions to be substantially perpendicular to a longitudinal axis of said at least one core;
  (f) sweeping said beam focal regions over said optical fiber along said target region while measuring multiphoton fluorescence from said at least one core, such that a maximum fluorescence level is indicative of location alignment of said beam focal regions with said at least one core; and
  (g) using said orientation and location alignments as spatial references for sweeping said beam focal region along said target region, while setting said peak pulse intensity to at least the threshold for inducing permanent refractive index changes in said optical fiber, to create said zone, said zone having an orientation and location within said optical fiber corresponding to the orientation and location respectively of said target region.

14. The method according to claim 13 wherein each of said pulsed laser light sources is operated at a pulse repetition rate of between 500 Hz and 1 GHz.

15. The method according to claim 12 wherein each of said laser light sources is a laser system in which the output of a frequency-doubled Erbium-doped fiber laser is amplified in a laser regenerative amplifier that is based on a Ti:Sapphire gain material.

16. The method according to claim 12 wherein each of said beams has a diameter of from 0.1 to 10 micrometers at the focal region thereof.

17. The method according to claim 12 wherein said focused pulsed laser light from each of said laser light sources is focused with a lens, axicon, focusing mirror, or combinations.

18. The method according to claim 17 wherein each said lens, axicon, or focusing mirror has a focal length from 1 to 30 mm and a numerical aperture from 0.05 to 1.3.

19. The method according to claim 12 wherein the focused pulsed laser light from each of said laser light sources is focused with reflective optics.

20. The method according to claim 12 wherein said pulse width is less than 200 femtoseconds.

21. The method according to claim 14 wherein said pulse repetition rate is from 1 kHz to 100 MHz.

22. The method according to claim 12 wherein said peak pulse intensity threshold for inducing permanent refractive index changes is at least $10^{10}$ W/cm$^2$.

23. The method according to claim 12 wherein said optical fiber is selected from the group of optical fibers consisting of: a conventional optical fiber; a polarization maintaining optical fiber; an optical fiber with a Germanium enriched core; a hydrogen deuterium loaded optical fiber; a W-fiber; a multiple cladded fiber; a photonics crystal fiber; intersecting optical fibers; a taper coupler; and a rare earth doped fiber.

24. A method for creating an optical waveguiding device from an elongated generally annular optical fiber made of a glass material and having at least one core and at least one cladding by creating a zone of permanently altered refractive index characteristics in the optical fiber, using focused beams generated by at least two pulsed laser light sources, each having:
  (i) a wavelength greater than the absorption edge of the glass material;
  (ii) a pulse width of less than 1 picosecond, and a pulse energy of between 1 nanojoule and 1 millijoule; and (iii) capable of achieving a peak pulse intensity within a defined focal region;

comprising the steps of:

(a) combining said laser beam focal regions to create a single beam focal region;

(b) aligning said single focal region with a defined target region within the optical fiber, said target region extending through the core and at least partially through the cladding of the optical fiber, at an acute angle to a longitudinal axis thereof;

(c) providing relative movement between said optical fiber and said beams such that said laser beam focal regions sweep along said target region; and (d) operating said laser light sources with the combined peak pulse intensity thereof and a repetition rate thereof selected to accumulate heat and to soften the glass material within the target region and to thereby induce permanent refractive index changes in the optical fiber within the target region;

said optical waveguiding device exhibiting controlled polarization sensitivity.

25. The method according to claim 24 wherein said step (d) comprises the steps of:

(e) reducing said peak pulse intensity of each laser light source such that the combination of the peak pulse intensities at said focal region is below the threshold for inducing permanent refractive index changes in said optical fiber;

(f) orienting said single beam focal region to be substantially perpendicular to a longitudinal axis of said at least one core;

(g) sweeping said single beam focal region over said optical fiber along said target region while measuring multiphoton fluorescence from said at least one core, such that a maximum fluorescence level is indicative of location alignment of said single beam focal region with said at least one core; and (h) using said orientation and location alignments as spatial references for sweeping said single beam focal region along said target region, while setting said peak pulse intensity to bring the combined peak pulse intensity to at least the threshold for inducing permanent refractive index changes in said optical fiber, to create said zone, said zone having an orientation and location within said optical fiber corresponding to the orientation and location of said target region.

26. The method according to claim 25 wherein at least one of said pulsed laser light sources is operated at a pulse repetition rate of between 500 Hz and 1 GHz.

27. The method according to claim 24 wherein each of said laser light sources is a laser system in which the output of a frequency-doubled Erbium-doped fiber laser is amplified in a laser regenerative amplifier that is based on a Ti:Sapphire gain material.

28. The method according to claim 24 wherein each of said beams has a diameter of from 0.1 to 10 micrometers at the focal region thereof.

29. The method according to claim 24 wherein the focused pulsed laser light from each of said laser light sources is focused with a lens, axicon, focusing mirror, or combinations.

30. The method according to claim 29 wherein each said lens has a focal length from 1 to 30 mm and a numerical aperture from 0.05 to 1.3.

31. The method according to claim 24 wherein the focused pulsed laser light from each of said laser light sources is focused with reflective optics.

32. The method according to claim 24 wherein said pulse width is less than 200 femtoseconds.

33. The method according to claim 26 wherein said pulse repetition rate is from 1 kHz to 100 MHz.

34. The method according to claim 24 wherein said peak pulse intensity threshold for inducing permanent refractive index changes is at least $10^{10}$ W/cm$^2$.

35. The method according to claim 24 wherein said optical fiber is selected from the group of optical fibers consisting of: a conventional optical fiber; a polarization maintaining optical fiber; an optical fiber with a Germanium enriched core; a hydrogen deuterium loaded optical fiber; a W-fiber; a multiple cladded fiber; a photonics crystal fiber; intersecting optical fibers; a taper coupler; and a rare earth doped fiber.

36. A method for improving coupling between an optical fiber and an optical source by modifying the refractive index characteristics of the optical fiber at or near the interface point by the method of claim 1 to reshape thereby the optical fiber mode field properties to match the field distribution created by the source at the interface with the fiber.

37. A method for improving coupling between two optical fibers having different refractive index profiles and corresponding optical mode field properties by modifying the refractive index characteristics of at least one of the optical fibers at or near the interface point by the method of claim 1 to reshape the mode field properties of said at least one of the optical fibers to match the final waveguide mode field properties of the two optical fibers at the interface for one or more wavelengths of operation.

38. The method of claim 1 including the step of positioning a volume of index matching fluid between said laser light source and said optical fiber such that said beam will pass through said fluid prior to reaching said target region.

39. A method for creating an optical waveguiding device from an elongated generally annular optical fiber made of glass material and having at least one core and at least one cladding by creating a zone of permanently altered refractive index characteristics in the optical fiber, using a focused beam which is generated by a pulsed laser light source having:

(i) a wavelength greater than the absorption edge of the glass material;

(ii) a pulse width of less than 1 picosecond, and a pulse energy of between 1 nanojoule and 1 millijoule; and (iii) capable of achieving a peak pulse intensity within a defined focal region;

comprising the steps of:

(a) applying mechanical stress to said optical fiber;

(b) aligning said laser beam focal region with a defined target region within the optical fiber;

(c) operating said laser light source with the peak pulse intensity thereof and a repetition rate thereof selected to accumulate heat and to soften the glass material at the target region and to thereby induce permanent refractive index changes in the optical fiber at the target region; and (d) removing said mechanical stress once said zone of altered refractive index characteristics has been created.

40. A method for creating an optical waveguiding device from an elongated generally annular optical fiber made of glass material and having at least one core and at least one cladding by creating a zone of permanently altered refractive index characteristics in the optical fiber, using a focused beam which is generated by a pulsed laser light source having:

(i) a wavelength greater than the absorption edge of the glass material;
(ii) a pulse width of less than 1 picosecond, and a pulse energy of between 1 nanojoule and 1 millijoule; and
(iii) capable of achieving a peak pulse intensity within a defined focal region;
comprising the steps of:
(a) applying an electric field to said optical fiber;
(b) aligning said laser beam focal region with a defined target region within the optical fiber;
(c) operating said laser light source with the peak pulse intensity thereof and a repetition rate thereof selected to accumulate heat and to soften the glass material at the target region and to thereby induce permanent refractive index changes in the optical fiber at the target region; and
(d) removing said electric field once said zone of altered refractive index characteristics has been created.

\* \* \* \* \*